United States Patent
Dehmubed et al.

(10) Patent No.: US 11,436,947 B2
(45) Date of Patent: Sep. 6, 2022

(54) PACKAGING SYSTEM WITH DETECTION OF PRODUCT TAMPERING AND/OR FALSIFICATION AND INTEGRATED GALVANIC CELL(S)

(71) Applicant: eTEP Inc., San Francisco, CA (US)

(72) Inventors: Rohinton S. Dehmubed, San Francisco, CA (US); Peter Gompper, San Francisco, CA (US)

(73) Assignee: eTEP Inc., San Francisco, CA (US)

( * ) Notice: Subject to any disclaimer, the term of this patent is extended or adjusted under 35 U.S.C. 154(b) by 0 days.

(21) Appl. No.: 16/896,166

(22) Filed: Jun. 8, 2020

(65) Prior Publication Data

US 2021/0383725 A1 Dec. 9, 2021

(51) Int. Cl.
*G09F 3/00* (2006.01)
*H01Q 1/22* (2006.01)
(Continued)

(52) U.S. Cl.
CPC .......... *G09F 3/0292* (2013.01); *G09F 3/0335* (2013.01); *H01Q 1/2225* (2013.01);
(Continued)

(58) Field of Classification Search
CPC ........ G09F 3/0292; G09F 3/00; G09F 3/0335; G09F 3/03; G09F 2003/0255; G09F 3/02;
(Continued)

(56) References Cited

U.S. PATENT DOCUMENTS 5,779,839 A 7/1998 Tuttle et al.
9,349,032 B1 * 5/2016 Diorio ................ G06K 7/10425
(Continued)

FOREIGN PATENT DOCUMENTS

WO 2006003648 A2 1/2006
WO 2020096805 A1 5/2020

OTHER PUBLICATIONS 18000-6 Type C (Gen2) and Type C/D (Gen2/Total) RFID IC, EM Microelectronic-Marin SA, Dec. 6, 2011, Version 2.0, pp. 1-4, available at <https://www.digchip.com/datasheets/parts/datasheet/147/EM4325-pdf.php>.

(Continued)

*Primary Examiner* — Justin V Lewis
(74) *Attorney, Agent, or Firm* — Gordon & Jacobson, P.C.

(57) ABSTRACT

A packaging system or tag is provided for at least one article or item, which employs a multilayer laminate structure that includes an encapsulated transformative material that is disposed between first and second conductive layers. The transformative material is configured to undergo a state change (for example, by a chemical reaction or physical change) that changes impedance between the first and second conductive layers in response to an intrusion or perforation through at least part of the multilayer laminate structure. Furthermore, one of the first and second conductive layers can be configured (for example, by printing or etching) to provide an RF antenna and a first electrode of the at least one integrated galvanic cell. The other of the first and second conductive layers can provide a second electrode of the at least one integrated galvanic cell. The at least one integrated galvanic cell is further provided by encapsulated electrolyte material and ion bridge disposed between the first and second conductive layers. At least one NFC/RFID integrated circuit is mechanically secured to the multilayer laminate structure (for example, in space between the first and second conductive layers) and electrically coupled to the coil antenna, the at least one galvanic cell, and other parts of the first and second conductive layers of the multilayer laminate structure. The galvanic cell can also be made to have long shelf life.

21 Claims, 22 Drawing Sheets

(51) Int. Cl.
    *G09F 3/02* (2006.01)
    *G06K 19/07* (2006.01)
    *G09F 3/03* (2006.01)

(52) U.S. Cl.
    CPC ............... *G09F 2003/0214* (2013.01); *G09F 2003/0255* (2013.01); *G09F 2003/0257* (2013.01)

(58) Field of Classification Search
    CPC .... G09F 2003/0214; G09F 2003/0257; H01Q 1/2225; H01Q 1/22
    USPC .......................... 283/72, 74, 81, 94, 98, 901
    See application file for complete search history.

(56) References Cited

U.S. PATENT DOCUMENTS

| | | | |
|---|---|---|---|
| 10,332,272 B2 | 6/2019 | Mianzo et al. | |
| 2004/0066296 A1* | 4/2004 | Atherton | G08B 13/1445 340/572.1 |
| 2011/0133905 A1* | 6/2011 | Hussain | G06K 7/10366 340/10.42 |

OTHER PUBLICATIONS

Caccami, Maria Cristina et al. "A Tightly Integrated Multilayer Battery Antenna for RFID Epidermal Applications." IEEE Transactions on Antennas and Propagation 66 (2018), pp. 609-617.
EP Search Report dated Oct. 19, 2021 of Application No. EP 21 17 8198.

\* cited by examiner

PACKAGING SYSTEM WITH DETECTION OF PRODUCT TAMPERING AND/OR FALSIFICATION AND INTEGRATED GALVANIC CELL(S)

BACKGROUND

1. Field

The present disclosure relates to a flexible laminate tag as a packaging solution that can verify and validate package and product identity, location, presence/proximity, time, integrity (including counterfeiting, tampering or theft), environmental status and categorization. The present disclosure also relates to packaging solutions that can provide information regarding those required by supply chain management, including real-time locating systems (RTLS) used to automatically identify and track the location of objects in real time throughout a supply chain.

2. State of the Art

The trade in counterfeit, imitation and falsified products is estimated at five percent to seven percent of overall world trade, which is greater than $600 billion per annum. Counterfeit, imitation and falsified products (including intrusion and tamper events, such as an unauthorized opening or modification to one or more packaged items) are major problems in several industries including drinks, foods, refined chemicals, medications, other pharmaceutical and medical products, nuclear power, and across brand-name, lifestyle/personal, and luxury goods. The theft of intellectual property and financial damage to producers and employees (in lost product revenue or personal income) and governments (in lost tax revenue) is only one aspect of the problem. There are also significant and real health risks due to counterfeit medications or other pharmaceutical and medical products and the use of harmful chemicals.

Packaging typically employ machine readable labels, such as bar codes, data matrix codes and NFC/RFID-tags, to encode information about one or more packaged items, which can be read by a suitable interrogator (e.g., bar code reader or NFC/RFID interrogator) as needed.

NFC/RFID systems offer advantages that are not available in bar code systems. Specifically, NFC/RFID systems use radio frequency data communication, which can occur:

without optical line of sight, because radio waves can penetrate many materials, at greater speeds, because many tags can be read quickly, whereas optical technology often requires time to manually reposition objects to make their bar codes visible, and over greater distances, because many radio technologies can transmit and receive signals more effectively than optical technology under most operating conditions.

The ability of NFC/RFID systems to communicate without optical line of sight and over greater distances than bar code systems further reduces the need for human involvement in the identification process. Furthermore, NFC/RFID systems often support other features that bar code systems do not have, such as rewritable memory, robust security features, directional tracking, and environmental sensors to record environmental events (such as temperature changes, sudden shocks, or high humidity).

NFC stands for Near Field Communication. RFID stands for Radio-Frequency Identification. NFC/RFID systems consist of one or more readers (or interrogators) and one or more tags (or transponders). The reader(s) and tag(s) transmit and receive radio frequency signals to support bidirectional wireless communication. NFC systems are similar to RFID systems and are based on the same or similar RFID communication protocols. The main difference with respect to RFID is that an NFC device can act as a reader and as a tag (card emulation mode). NFC devices also provide a peer-to-peer mode to support the transfer information between two NFC devices. NFC systems operate on the same frequency as HF RFID (13.56 MHz) systems. Therefore, NFC systems have short read range limitations. Because of these short-read range limitations, NFC devices have to be in very close proximity—usually no more than a few centimeters. Due to such short-read range limitations, NFC systems are often used for secure communications, especially for access controls or in the consumer sector for contactless payment.

Both NFC and RFID systems (herein referred to as NFC/RFID systems) typically include an RF subsystem and an enterprise subsystem. The RF subsystem performs identification and related transactions using wireless communication. The enterprise subsystem includes computers running specialized software that can store, process, and analyze data acquired from RF subsystem transactions to make the data useful to a supported business process. The RF subsystem includes two components: one or more tags (or transponders) and one or more readers. The tag is an electronic device (which includes an RFID integrated circuit coupled to an antenna) that is affixed to (or embedded in) an item or object. The RFID integrated circuit of the tag includes circuit functionality that cooperates with the antenna of the tag to transmit (modulate) and receive (demodulate) RF signals. The RFID integrated circuit of the tag also includes memory that typically stores a unique identifier and possibly additional data. The tag can include other features, such as environmental sensors and security mechanisms. The reader (or interrogator) is an electronic device that wirelessly communicates with tags to identify the corresponding object or item and possibly associate related data with the tagged object or item. The reader and the tag employ two-way radios for directional RF data communication. In NFC systems, the NFC devices can employ integrated circuits that support the functionality of a tag, a reader, both tag and reader, or provide peer-to-peer communication. As such, an NFC device can be equated to a tag or a reader as described herein.

Tags can be categorized into types based on power source, which include passive tags and active tags. A passive tag includes a NFC/RFID integrated circuit with circuit functionality that harvests electrical power from the RF electromagnetic energy transmitted by a reader. The harvested electrical power is stored and used to provide electrical power to perform functions of the tag, such as sending radio signals to a reader, storing and retrieving data, and performing other computations (e.g., those needed for security mechanisms). Typically, the NFC/RFID integrated circuit of the passive tag employs an on-chip capacitor (Cstore) in the range of 0.1 nF-1.0 nF for energy storage of harvested electromagnetic energy. The reply signal from a passive tag to a reader has only a fraction of the power of the reader's signal. This limited power significantly restricts the operating range of the tag. It also means that passive tags can only support data processing of limited complexity. On the other hand, passive tags typically are cheaper, smaller, and lighter than other types of tags, which are compelling advantages for many NFC/RFID applications. An active tag includes a battery that supplies electrical power to the RFID integrated circuit of the active tag to enable communication from the tag to the reader, power on-board circuitry, and perform other functions. Active tags can communicate over greater distance than passive tags, but they have a finite battery life and are generally larger and more expensive. Furthermore, active tags can typically respond to lower power signals than passive tags. The RFID integrated circuit of the active tag can also include circuit functionality that harvests electrical power from the RF electromagnetic energy transmitted by a reader. The harvested electrical power can be stored and used to provide electrical power to perform functions of the tag, such as sending radio signals to a reader, storing and retrieving data, and performing other computations (e.g., those needed for security mechanisms)

For active tags, the range of RF communication between the tag and the reader is limited by the size and power density of the battery powering the tag and the sensitivity of the receiver circuitry in the tag and the reader. For both passive and active tags, the range of RF communication between the tag and the reader is limited by the DC activation energy of the on-board circuitry of the RFID integrated circuit of the tag. The sensitivity of the RF receiver circuitry in the tag and the reader is usually orders of magnitude lower. The sensitivity of the RF link receiver circuitry is directly related to the ratio of energy per bit (Eb) to the noise spectral density (No) for a given bit error rate (BER). This is in the range of −42 dBm to −110 dBm for 100 kbps QPSK at BER of $10^{-6}$. For some second-generation UHF (900 MHz) tags, the activation energy of the on-board circuitry of the tag can be around 10 microwatts (−20 dBm) and as low as −24 dBm in some designs, and is considerably larger than the RF link receiver sensitivity. Thus, in the case of passive tags the activation energy of the RFID integrated circuit sets the range. The range in an active tag doesn't have this limitation because the battery powers the integrated circuit and is set by the RF link communication block.

Passive tags typically come in two forms: NFC tags which rely on near field coupling (also referred to as inductive coupling) and far-field RFID tags. The NFC tags operate at VHF or lower frequencies, typically 13.56 MHz ISM band. The far field RFID tags operate at UHF ISM bands which typically include the 900 MHz and the 2.4 GHz ISM bands. The near field NFC tags have very limited range (in tens of centimeters) and as such are not conducive to inventory management and asset location applications which require larger ranges (in meters). Far-field RFID UHF tags come in two varieties, passive and active.

In the case of a passive RFID tag, the path loss is typically proportional to $(R/\text{lambda})^2$ for the forward link and $(R/\text{lambda})^2$ for the back link. This means that for a passive RFID tag the signal loss is proportional to $(R/\text{lambda})^4$. The passive tag has another constraint; the RFID tag must receive sufficient power such that it can harvest the power to run electronics of the chip necessary to modulate backscatter. For state-of-the-art ultra-low energy RFID tags (with −24 dBm sensitivity) power harvesting sets the maximum limit of the tags range. The total link budget which is limited by the Equivalent Isotropically Radiated Power (EIRP) of the interrogator transmitter is set by regulatory agencies and is in the range of 50-54 dBs. At 900 MHz the EIRP limits the range to less than 10 m with zero fade margin. Practically speaking, most systems have ranges of 5 m or less and with a less than 10 dB fade margin.

For an active tag powered by a battery, there are two independent links: forward link from interrogator to tag, and reverse link from tag to interrogator. The forward link budget is seldom the limiting factor as the interrogator has a very high output power compared to the tag—which is limited mainly by regulatory agencies. In the US the FCC limits it to 30 dBm of EIRP for the 900 MHz and 2.4 GHz ISM bands. The bottleneck is the reverse link from tag to interrogator, and as such it determines the system's range and fade margin. The interrogator receiver sensitivity is limited by the thermal noise given by the expression kTB, wherein B is the bandwidth (in Hertz) of the digital communication link, T is the absolute temperature (in Kelvins) and k is the Boltzmann's constant.

The RF receiver sensitivity of interrogator (Rint) is limited by the thermal noise floor. Key parameters are the Range (R), the RF frequency (f), the modulation format and bitrate (BR) and the tag transmitted RF power (Ptag) and the interrogator RF receiver sensitivity (Rint). The Path Loss (PL) in dBs is expressed as: PL=20 Log(4*Pi*R*f/c) wherein c is the speed of light. Thus, at 900 MHz and range of 25 m, this computes to 60 dB.

Ptag is limited by the onboard battery of the RFID tag. It is in the range of −20 dBm (10 microWatt) to −30 dBm (1 microWatt). Most state of the art interrogators can be designed to be within 3 dB Noise Figure (NF) of thermal noise. The thermal noise floor is: −174 dBm/Hertz-K at room temperature of 290K. For a digital link with QPSK modulation running at Bit Error Rate (BER) of $10^{-6}$ and NF of 3 dB, the Rint for the thermal noise floor is −110 dBm at 100 kbps and −120 dBm at 10 kbps. The fade margin (FM) in dBs for the reverse link and hence the system is simply expressed as:

$$FM=Ptag-PL-R\text{ int,}$$

where all of the parameters are in dBs.

For an active tag to provide long-range reads on the order of ≥10 meters or more, a supply of 10 to 100 microwatts would be required for 100,000+ cycles. Such a tag would require a 0.1 to 1.0 Joule battery capacity, or a 0.028 to 0.28 microwatt-hour battery. 100,000 cycles are equivalent to a one read-cycle every five minutes for a period of one-year, or a two read-cycle per hour for a six-years period. Such read-cycle periods enable the active tag to handle functions which smaller-range passive tags are incapable, including those required by real-time locating systems (RTLS) used to automatically identify and track the location of objects in real time within a building or other contained area or throughout a supply chain.

SUMMARY

In embodiments, a packaging system or tag is provided for at least one article or item, which employs a multilayer laminate structure that includes an encapsulated transformative material that is disposed between first and second conductive layers. The transformative material is configured to undergo a state change (for example, by a chemical reaction or physical change) that changes impedance between the first and second conductive layers in response to an intrusion or perforation through at least part of the multilayer laminate structure. Furthermore, one of the first and second conductive layers can be configured (for example, by printing or etching) to provide a coil antenna and a first electrode (e.g., cathode) of at least one integrated galvanic cell. The other of the first and second conductive layers can provide a second electrode (e.g., anode) of the at least one integrated galvanic cell. The at least one integrated galvanic cell is further provided by encapsulated electrolyte material and ion bridge disposed between the first and second conductive layers. At least one NFC/RFID integrated circuit is mechanically secured to the multilayer laminate structure (for example, in space between the first and second conductive layers) and electrically coupled to the coil antenna, the at least one galvanic cell, and other parts of the first and second conductive layers of the multilayer laminate structure.

The at least one integrated galvanic cell can be configured to supply electrical power (in the form of at least one DC voltage signal) to the at least one NFC/RFID integrated circuit. The at least one NFC/RFID integrated circuit can be configured to use the electrical power supplied by the at least one integrated galvanic cell to power some or all of its on-chip circuitry. For example, one or more NFC/RFID integrated circuits can be configured to operate as part of an active tag that uses the electrical power supplied by the at least one integrated galvanic cell to power the circuitry of the NFC/RFID integrated circuit(s). In another example, one or more NFC/RFID integrated circuits can be configured to operate as part of a passive tag (or battery-assisted passive tag) that uses the electrical power supplied by the at least one integrated galvanic cell to power some circuit functions of the NFC/RFID integrated circuit(s). In this embodiment, the NFC/RFID integrated circuit(s) can include electrical circuitry that harvests electrical power from the RF signal supplied by an external reader. In this case, the NFC/RFID integrated circuit(s) can be configured to cooperate with the antenna to receive and store electrical power from electromagnetic radiation emitted by the external reader. In another example, one or more NFC/RFID integrated circuits can be configured to operate as part of an active tag that uses the electrical power supplied by the at least one integrated battery cell to power the circuitry of the NFC/RFID integrated circuit(s).

In embodiments, the at least one NFC/RFID integrated circuit includes a power supply terminal that is electrically coupled to the at least one integrated galvanic cell, wherein the at least one NFC/RFID integrated circuit and its power supply terminal are disposed inside the multilayer laminate structure and inaccessible or hidden from the external environment.

In embodiments, the transformative material of the multilayer laminate structure and the electrolyte material of the at least one integrated galvanic cell can be the same material (such as a silver nitrate gel or gel of an aqueous solution of silver nitrate and zinc nitrate), which is encapsulated as a continuous layer in the multilayer laminate structure.

In other embodiments, the transformative material and the electrolyte material of the at least one integrated galvanic cell can be different materials (such as microcapsules of transformative material and silver nitrate gel or gel of an aqueous solution of silver nitrate. These different materials can be disposed and possibly isolated from one another in different regions (areas) of the multilayer laminate structure.

In embodiments, at least one operational characteristic of the NFC/RFID integrated circuit(s) of the system or tag can be dependent on the change in impedance between parts of the first and second conductive layers of the multilayer laminate structure that are electrically coupled to the NFC/RFID integrated circuit as provided by the encapsulated transformative material in response to the intrusion or perforation. The operational characteristic of the NFC/RFID integrated circuit can be ascertained and analyzed (for example, by suitable operations of an external reader) to detect the intrusion and provide an indication of the intrusion if and when detected.

In embodiments, the one of first and second conductive layers (which is configured to define the coil antenna and first electrode for the galvanic cell(s)) can be configured (for example, by printing or etching) to define a detection surface. In this embodiment, the transformative material can be configured to undergo a state change (for example, by chemical reaction or physical change) that changes impedance between the detection surface and the other conductive layer in response to an intrusion in the vicinity of the detection surface. The detection surface can be electrically coupled to a corresponding input terminal of the NFC/RFID integrated circuit(s). The NFC/RFID integrated circuit(s) can be configured to detect a signal at the input terminal that results from the impedance change between the detection surface and the other conductive layer due to the intrusion in the vicinity of the detection surface. The NFC/RFID integrated circuit(s) can be further configured to derive data from such signal and communicate the data to an external reader. The external reader can analyze the data communicated from the NFC/RFID integrated circuit(s) to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the one of first and second conductive layers (which is configured to define the coil antenna and the first electrode for the galvanic cell(s)) can be configured (for example, by printing or etching) to define a plurality of detection surfaces. In this configuration, the transformative material can be configured to undergo a state change (for example, by chemical reaction or physical change) that changes impedance between a respective detection surface and the other conductive layer in response to intrusion in the vicinity of the respective detection surface. The detection surfaces can be electrically coupled to corresponding input terminals of the NFC/RFID integrated circuit(s). The NFC/RFID integrated circuit(s) can be configured to detect a signal at a respective input terminal that results from the change in impedance between the corresponding detection surface and the other conductive layer due to the intrusion. The NFC/RFID integrated circuit(s) can be further configured to derive data from such signal and communicate the data to an external reader. The external reader can analyze the data communicated from the NFC/RFID integrated circuit(s) to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the one of first and second conductive layers (which is configured to define the coil antenna and the first electrode for the galvanic cell(s)) can be configured to form a set of distinct sections or fingers. One or more pairs of fingers in the set are electrically connected to one another by metal traces or wires or other suitable conductive material, while the other pairs of fingers in the set are electrically-disconnected from one another by insulating material, insulating void space or other suitable insulating material. The set of fingers can be electrically coupled to corresponding input terminals of an NFC/RFID integrated circuit, which is also coupled to the coil antenna and galvanic cell(s) and integrated together as part the packaging system or tag. In response to one or more commands communicated by an external reader, the NFC/RFID integrated circuit can be configured to sense and decode voltage signals received at its input terminals. The electrical connection(s) and disconnection(s) of the fingers and the interconnection of the fingers to the input terminals of the NFC/RFID integrated circuit are dictated by the known design and manufacture of the packaging system or tag. The particular design will produce voltage signals at the input terminals of the NFC/RFID integrated circuit that decode to a predefined codeword. This predefined codeword is associated with genuine packaged goods and is used to distinguish the genuine packaged goods from counterfeit or falsified goods.

If an attempt has been made to lift the chip for reuse, and the NFC/RFID integrated circuit loses the Vcc connection with the integrated one or more galvanic cell(s), the internal circuitry of the NFC/RFID integrated circuit can register the event as evidence of tampering.

DETAILED DESCRIPTION OF THE PREFERRED EMBODIMENTS

Figure 1A:
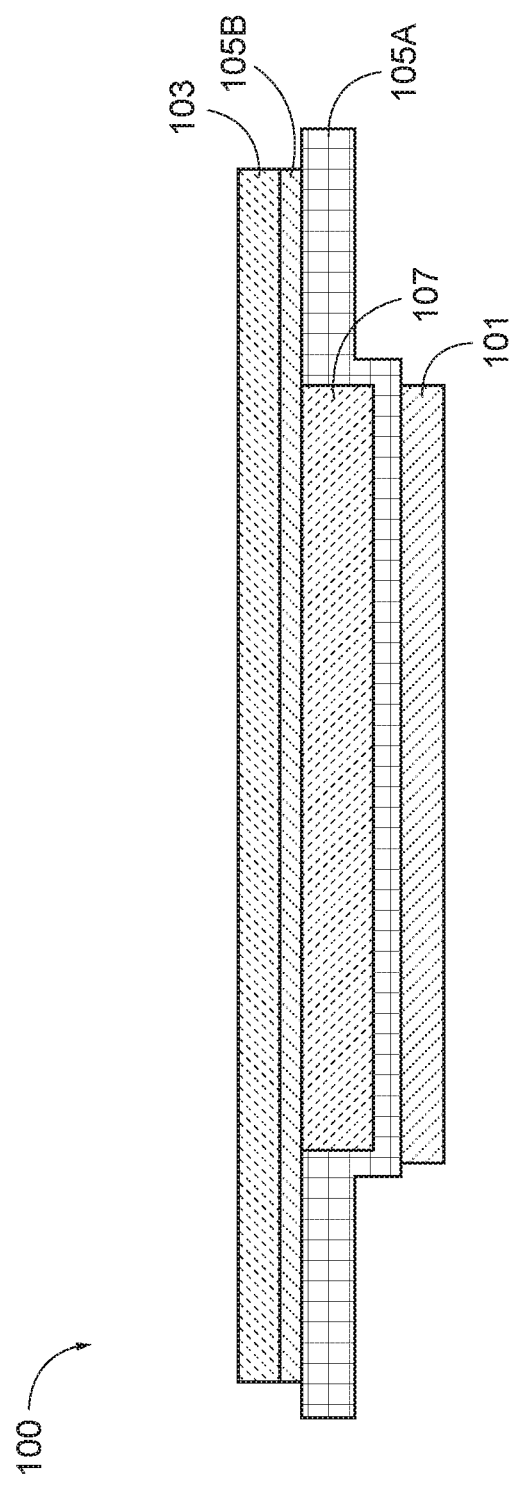
FIG. 1A is a schematic cross-sectional view of an exemplary multilayer laminate structure that can be used in packaging systems according to the present disclosure.

The following definitions apply to the present disclosure.

The term "relatively high impedance electrical current path" and "relatively low impedance electrical current path" are relative terms, where the "relatively high impedance electrical current path" has an impedance that is significantly larger than the "relatively low impedance electrical current path"; in embodiments, the "relatively high impedance electrical current path" can have an impedance that is at least 1,000 times that of the "relatively low impedance electrical current path"; in other embodiments, the "relatively high impedance electrical current path" can have an impedance that at least 10,000 times that of the "relatively low impedance electrical current path"; and in still other embodiments, the "relatively high impedance electrical current path" can have an impedance that at least 100,000 times that of the "relatively low impedance electrical current path."

The term "sensing" means the function or operation of the multilayer laminate structure to detect an intrusion or other event (example, a chemical change or radiation) that results in a detectable change in impedance between the top and the bottom conductive layers.

The term "NFC/RFID integrated circuit" is an integrated circuit that supports the operation of tag of an NFC/RFID system; the NFC/RFID integrated circuit can also support the operations of a reader or tag and reader or provide peer-to-peer communications for NFC applications; the "NFC/RFID" integrated circuit is configured to interface to an antenna to transmit and receive RF signals according to a predefined communication protocol; the "NFC/RFID integrated circuit" also includes memory for storing an identifier and possibly additional data that can be communicated by the RF signals transmitted and received by the operations of the NFC/RFID integrated circuit and antenna;

The present disclosure includes a packaging system or tag for at least one article or item, which includes a multilayer laminate structure that includes an encapsulated transformative material that is disposed between first and second conductive layers. The transformative material is configured to undergo a state change (for example, by a chemical reaction or physical change) that changes impedance between the first and second conductive layers in response to an intrusion or perforation through at least part of the multilayer laminate structure. Furthermore, one of the first and second conductive layers can be configured (for example, by printing or etching) to provide a coil antenna and a first electrode of at least one integrated galvanic cell. The other of the first and second conductive layers provides a second electrode of the at least one integrated galvanic cell. The at least one integrated galvanic cell is further provided by encapsulated electrolyte material and an ion bridge disposed between the first and second conductive layers. At least one NFC/RFID integrated circuit is mechanically secured to the multilayer laminate structure (for example, in space between the first and second conductive layers) and electrically coupled to the coil antenna, the at least one galvanic cell, and other parts of the first and second conductive layers of the multilayer laminate structure.

The at least one integrated galvanic cell can be configured to supply electrical power (in the form of at least one DC voltage signal) to the at least one NFC/RFID integrated circuit. The at least one NFC/RFID integrated circuit can be configured to use the electrical power supplied by the at least one integrated galvanic cell to power some or all of its on-chip circuitry. The NFC/RFID integrated circuit may (or may not have) have an on-chip power harvesting circuitry which can provide a portion, or all of the power required for its operation. For example, one or more NFC/RFID integrated circuits can be configured to operate as part of a semi-passive tag (or battery-assisted passive tag) that uses the electrical power supplied by the at least one integrated galvanic cell to power some circuit functions of the NFC/RFID integrated circuit(s), when the harvested power by the integrated circuit is not sufficient for its operation. In such cases, the NFC/RFID integrated circuit(s) can be configured to cooperate with the antenna to receive and store electrical power from electromagnetic radiation emitted by the external reader. In another example, one or more NFC/RFID integrated circuits can be configured to operate as part of an active tag that uses the electrical power supplied by the at least one integrated galvanic cell to power the circuitry of the NFC/RFID integrated circuit(s).

In embodiments, the transformative material of the multilayer laminate structure and the electrolyte material of the at least one integrated galvanic cell can be the same material, such as a silver nitrate gel or aqueous solution of silver nitrate and other soluble nitrates like zinc nitrate, lithium nitrate, sodium nitrate gel which is encapsulated as a continuous layer in the multilayer laminate structure.

In other embodiments, the transformative material and the electrolyte material of the at least one integrated galvanic cell can be different materials, such as microcapsules of transformative material and silver nitrate gel. These different materials can be disposed (and possibly isolated from one another) in different areas of the multilayer laminate structure.

In embodiments, at least one operational characteristic of the NFC/RFID integrated circuit(s) of the system or tag is dependent on the change in impedance between parts of the first and second conductive layers of the multilayer laminate structure that are electrically coupled to the NFC/RFID integrated circuit as provided by the encapsulated transformative material in response to the intrusion or perforation. The operational characteristic of the NFC/RFID integrated circuit can be ascertained and analyzed (for example, by suitable operations of an external reader) to detect the intrusion and provide an indication of the intrusion if and when detected.

In embodiments, the one of first and second conductive layers (which is configured to define the coil antenna and first electrode for the galvanic cell(s)) can be configured (for example, by printing or etching) to define a detection surface. In this embodiment, the transformative material can be configured to undergo a state change (for example, by chemical reaction or physical change) that changes impedance between the detection surface and the other conductive layer in response to an intrusion in the vicinity of the detection surface. The detection surface can be electrically coupled to a corresponding input terminal of the NFC/RFID integrated circuit(s). The NFC/RFID integrated circuit(s) can be configured to detect a signal at the input terminal that results from the impedance change between the detection surface and the other conductive layer due to the intrusion in the vicinity of the detection surface. The NFC/RFID integrated circuit(s) can be further configured to derive data from such signal and communicate the data to an external reader. The external reader can analyze the data communicated from the NFC/RFID integrated circuit(s) to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the multilayer laminate structure can have a first configuration that provides a relatively high impedance electrical current path between the detection surface and the other conductive layer under normal conditions absent intrusion in vicinity of the detection surface. The multilayer laminate structure can also have a second configuration where the transformative material undergoes a state change (for example, by a chemical reaction or physical change) such that the material provides all or part of a relatively low impedance electrical current path between the detection surface and the other conductive layer in response to the intrusion in vicinity of the detection surface. A resistor can be electrically coupled between a positive voltage supply terminal of the NFC/RFID integrated circuit(s) and the detection surface. The other conductive layer can be electrically connected to a ground or common body terminal of the NFC/RFID integrated circuit(s). The area covered by the detection surface can be configured such that the detection surface encompasses a part, nearly all or all of the area of a sensing barrier of the packaging or tag.

In embodiments, the multilayer laminate structure can function under normal conditions as a flexible two-plate capacitor with the detection surface equivalent to one plate and the other conductive layer equivalent to an opposed plate of the capacitor, and the encapsulated transformative material equivalent to the dielectric medium between the two plates. As a two-plate capacitor, the multilayer laminate structure provides a relatively high impedance electrical current path between the detection surface and the other conductive layer. In response to intrusion in the vicinity of the detection surface, the transformative material can be configured to undergo a state change (for example, by a chemical reaction or physical change) such that the material provides all or part of a relatively low impedance electrical current path between the detection surface and the other conductive layer.

In embodiments, the one of first and second conductive layers (which is configured to define the coil antenna and the first electrode for the galvanic cell(s)) can be configured (for example, by printing or etching) to define a plurality of detection surfaces. In this configuration, the transformative material can be configured to undergo a state change (for example, by chemical reaction or physical change) that changes impedance between a respective detection surface and the other conductive layer in response to intrusion in the vicinity of the respective detection surface. The detection surfaces can be electrically coupled to corresponding input terminals of the NFC/RFID integrated circuit(s). The NFC/RFID integrated circuit(s) can be configured to detect a signal at a respective input terminal that results from the change in impedance between the corresponding detection surface and the other conductive layer due to the intrusion. The NFC/RFID integrated circuit(s) can be further configured to derive data from such signal and communicate the data to an external reader. The external reader can analyze the data communicated from the NFC/RFID integrated circuit(s) to interpret the data as a signal of the intrusion (for example, by comparing the data to the expected data value(s) representing an intrusion or non-intrusion event), and output an indication (e.g., visual or audible notification) of the intrusion if and when the intrusion is detected.

In embodiments, the multilayer laminate structure can have a first configuration that provides a relatively high impedance electrical current path between each detection surface and the other conductive layer under normal conditions absent intrusion in vicinity of the detection surfaces. The multilayer laminate structure can also have a second configuration where the transformative material undergoes a state change (for example, by a chemical reaction or physical change) such that the material provides all or part of a relatively low impedance electrical current path between a respective detection surface and the other conductive layer in response to intrusion in vicinity of the respective detection surface. Resistors can be electrically coupled between a positive voltage supply terminal of the NFC/RFID integrated circuit(s) and corresponding detection surfaces. The other conductive layer can be electrically connected to a ground or common body terminal of the NFC/RFID integrated circuit(s). The lateral spacing between the detection surfaces can be minimized and/or the area covered by the detection surfaces can be configured such that the detection surfaces encompasses a part, nearly all or all of the area of a sensing barrier of the packaging or tag.

In embodiments, the multilayer laminate structure can function under normal conditions as a parallel network of flexible two-plate capacitors with the plurality of detection surfaces equivalent to respective plates of the capacitors and the other conductive layer equivalent to an opposed common plate of the capacitors, and the encapsulated transformative material equivalent to the dielectric medium between the two plates of the capacitors. For each two-plate capacitor of the network, the multilayer laminate structure provides a relatively high impedance electrical current path between the respective detection surface and the other conductive layer. In response to intrusion in the vicinity of the respective detection surface, the transformative material can be configured to undergo a state change (for example, by chemical reaction or physical change) such that the material provides all or part of a relatively low impedance electrical current path between the respective detection surface and the other conductive layer.

In embodiments, the one of first and second conductive layers (which is configured to define the coil antenna and the first electrode for the galvanic cell(s)) can be configured to form a set of distinct sections or fingers. One or more pairs of fingers in the set are electrically connected to one another by metal traces or wires or other suitable conductive material, while the other pairs of fingers in the set are electrically-disconnected from one another by insulating material, insulating void space or other suitable insulating material. The set of fingers can be electrically coupled to corresponding input terminals of an NFC/RFID integrated circuit, which is also coupled to the coil antenna and galvanic cell(s) and integrated together as part the packaging system or tag. In response to one or more commands communicated by an external reader, the NFC/RFID integrated circuit can be configured to sense and decode voltage signals received at its input terminals. The electrical connection(s) and disconnection(s) of the fingers and the interconnection of the fingers to the input terminals of the NFC/RFID integrated circuit are dictated by the known design and manufacture of the packaging system or tag. The particular design will produce voltage signals at the input terminals of the NFC/RFID integrated circuit that decode to a predefined codeword. This predefined codeword is associated with genuine packaged goods and is used to distinguish the genuine packaged goods from counterfeit or falsified goods.

More specifically, an attempt to copy the packaging design for counterfeit or falsified goods will require that the copy replicate the electrical connection(s) and disconnection(s) of the finger pairs and the interconnection of the fingers to the input terminals of the NFC/RFID integrated circuit. Such replication can be made very difficult to accomplish (for example, by obfuscating or hiding the interconnection between fingers and by laying out and interconnecting the fingers in a complex or random pattern), and failure to do so will produce voltage signals at the input terminals of the NFC/RFID integrated circuit that do not decode to the predefined codeword. The NFC/RFID integrated circuit can be configured to detect and register mismatch between the predefined codeword and the codeword detected by sensing and decoding the voltage signals received at the input terminals of the NFC/RFID integrated circuit, and output a signal indictor based thereon for communication to the external reader. For example, the signal indicator can indicate the absence of suspected counterfeit or falsified goods in the event that the voltage signals produced at the input terminals of the NFC/RFID integrated circuit do decode to the predefined codeword. In another example, the signal indicator can indicate the presence of suspected counterfeit or falsified goods in the event that the voltage signals produced at the input terminals of the NFC/RFID integrated circuit do not decode to the predefined codeword.

In embodiments, the transformative material can undergo a state change (for example, by chemical reaction or physical change) that causes a change in impedance between the opposed conductive layers of the multilayer laminate structure. For illustration purposes, a silver nitrate gel solution (or aqueous solution of silver nitrate and soluble nitrates such as zinc nitrate, lithium nitrate, sodium nitrate) can be used for the transformative material. Absent an intrusion, the multilayer laminate structure provides a relatively high impedance electrical current path between the first and second conductive layers of the multilayer laminate structure. In response to an intrusion (i.e., when an intrusion occurs), the silver nitrate gel solution (or aqueous solution of silver nitrate and soluble nitrates like zinc nitrate, lithium nitrate, sodium nitrate) can form all or part of a relatively low impedance electrical current path between the first and second conductive layers of the multilayer laminate structure. The silver nitrate gel solution (or aqueous solution of silver nitrate and soluble nitrates like zinc nitrate, lithium nitrate, sodium nitrate) by itself is conductive and it can flow to contact both of the first and second conductive layers of the multilayer laminate structure in response to the intrusion. In this manner, the flow of the silver nitrate gel solution (or aqueous solution of silver nitrate and soluble nitrates like zinc nitrate, lithium nitrate, sodium nitrate) can form all or part of a relatively low impedance current path between the first and second conductive layers. Furthermore, with the silver nitrate gel solution (or aqueous solution of silver nitrate and soluble nitrates like zinc nitrate, lithium nitrate, sodium nitrate) in contact with the appropriate metal(s) of the first and second conductive layers, the silver nitrate gel solution (or aqueous solution of silver nitrate and soluble nitrates like zinc nitrate, lithium nitrate, sodium nitrate) can undergo a galvanic displacement reaction that precipitates solid-phase silver in response to the intrusion. The solid-phase silver precipitate in conjunction with the conductive silver nitrate gel solution (or aqueous solution of silver nitrate and soluble nitrates like zinc nitrate, lithium nitrate, sodium nitrate) can also form all or part of a relatively low impedance electrical current path between the first and second conductive layers. Moreover, the precipitation of the solid-phase silver can continue such that the solid phase silver precipitate extends between first and second conductive layers and the solid phase silver precipitate alone (or aqueous solution of silver nitrate and soluble nitrates like zinc nitrate, lithium nitrate, sodium nitrate) forms all or part of a relatively low impedance electrical current path between the first and second conductive layers.

In embodiments, the first and second conductive layer can include conductive surfaces, such as layers of suitable metals (e.g., copper, zinc, tin, zinc/tin/nickel coated copper for the first conductive layer, and silver or a zinc/copper/tin or an alloy coated with silver for the second conductive layer) that support a galvanic displacement reaction with metal ions of a solution (for example an aqueous solution of silver nitrate and soluble nitrates like zinc nitrate, lithium nitrate, sodium nitrate) to precipitate solid-phase metallic silver from the solution. In embodiments, parts of the conductive layer that is configured to define the coil antenna, the first electrode for the galvanic cell(s)) and the detection surface(s) can be covered by an insulating layer. This insulating/passivating layer can also be configured to cover and passivate the NFC/RFID integrated circuit(s) (for example, protecting the NFC/RFID integrated circuit(s) from contact with the transformative material that partially surrounds the space occupied by the integrated circuit(s)). Furthermore, the insulating layer can be configured (for example, by printing or etching) wherein an opening in the insulating layer is defined that exposes a part of the conductive layer that forms the first electrode of the galvanic cell. The ion bridge of the galvanic cell(s) can be printed or otherwise formed or placed to occupy and fill this opening.

In embodiments, the multilayer laminate structure can include an encapsulated reagent disposed between the first and second conductive layers. The reagent can be configured to react with the transformative material in response to an intrusion event and aids in the transformation of the transformative material. For illustrative purposes, in the case where the transformation material is a silver nitrate gel solution, the reagent can be a solution of sodium borohydride and/or glucose that assists or enhances the galvanic displacement reaction of silver nitrate solution that precipitates solid-phase silver. The reagent can possibly include other components such as catalysts, stabilizers, surfactants or initiators, in any combination thereof.

In embodiments, the multilayer laminate structure can include microcapsules of reagent that are dispersed in a matrix of the transformative material. In other embodiments, the multilayer laminate structure can include microcapsules of the transformative material that are dispersed in a matrix of the reagent. In yet another embodiment, the multilayer laminate structure can include microcapsules of transformative material and microcapsules of reagent that are both dispersed in an inert matrix.

Figure 1B:
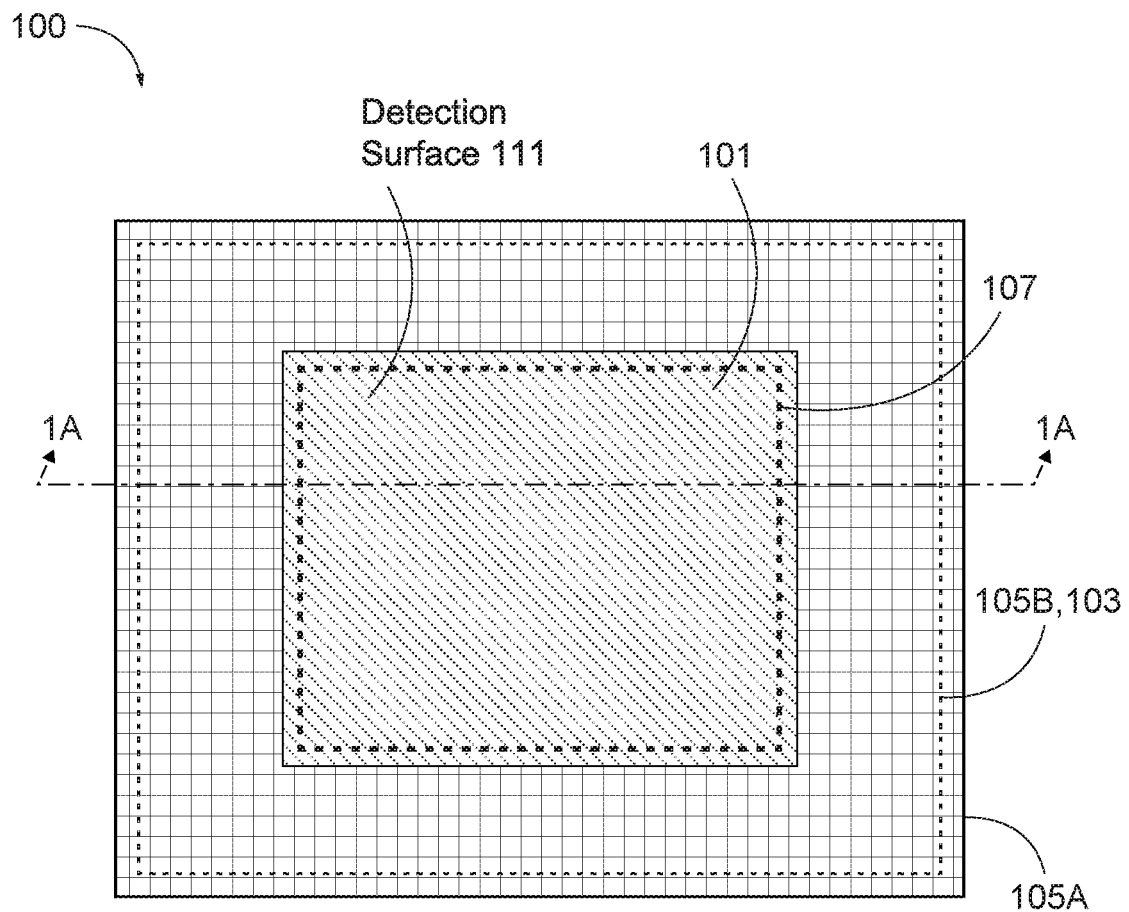
FIG. 1B is a schematic bottom view of the multilayer laminate structure of FIG. 1A.
Figure 1C:
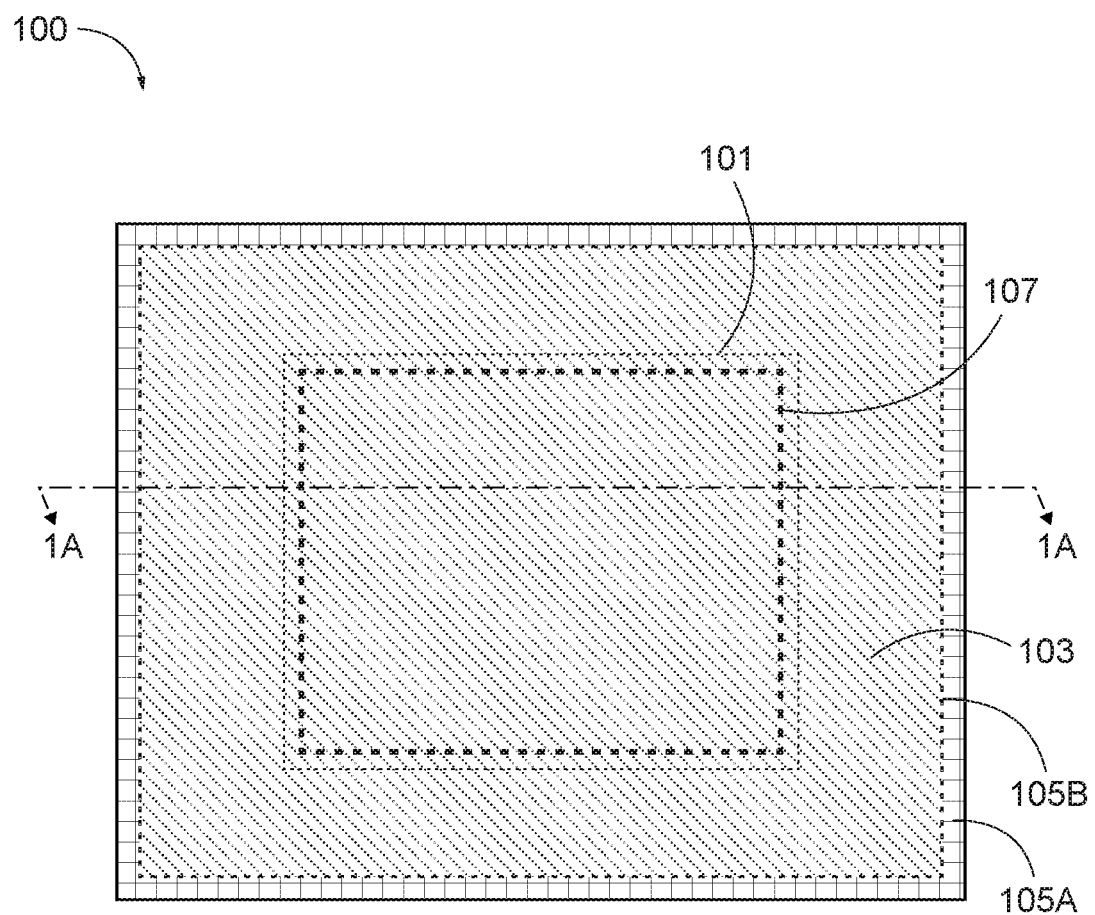
FIG. 1C is a schematic top view of the multilayer laminate structure of FIG. 1A.

FIGS. 1A, 1B and 1C show an example flexible multilayer laminate structure 100 that can be used to form the packaging system or tag, which includes a first conductive layer 101, a second conductive layer 103, and intermediate layers 105A and 105B that encapsulate transformative material 107 disposed between the first and second conductive layers 101, 103. The layers may be thin flexible sheets such that the multilayer laminate structure 100 is flexible in nature and thus is able to bend or fold. In embodiments, the multilayer laminate structure 100 can be formed by suitable printing technologies, such as continuous gravure or rolled based printing, roll-to-roll printing, stamp printing or inkjet printing. Various microprinting technologies can also be used if desired.

The transformative material 107 may include, for instance, a metal ion solution such as silver nitrate gel solution (or aqueous solution of silver nitrate and soluble nitrates like zinc nitrate, lithium nitrate, sodium nitrate) with silver ions that precipitate as solid-phase silver by a galvanic displacement reaction with metals like zinc, copper, tin, nickel which are higher up in the electrochemical series than silver. The first and second conductive layers 101 and 103 can be formed from a conductive material (e.g., a noble metal like zinc, copper, tin, nickel) that undergoes a galvanic displacement reaction with a transformative material 107, such as for instance, silver ions of a silver nitrate gel solution (or aqueous solution of silver nitrate and soluble nitrates like zinc nitrate, lithium nitrate, sodium nitrate) to precipitate solid-phase silver from the silver nitrate gel solution (or aqueous solution of silver nitrate and soluble nitrates like zinc nitrate, lithium nitrate, sodium nitrate). Other metal ion solutions can be paired with other metals that support the galvanic displacement reaction with the metal ion solution and precipitates solid-phase metal from the solution. The intermediate layer 105A can be formed from a thin film of a conductive material (such as a conductive polymer). The intermediate layer 105B can be formed from a thin film of electrically-insulating material such as polyethylene terephthalate (PET), photo-resistant polymer, Mylar, a spun polymer with a metallic oxide coating, or other encapsulating or insulating material. Alternately, the intermediate layer 105B can be formed from a hard electrically-insulating material, such as a hard polymer film of Kapton and/or Mylar and/or BoPET or another hard polymer than can be spin-coated or dip coated. The hardness of the polymer film can be in the range of shore 40D to shore 80D or higher. The thickness of the polymer film can range from 5 microns to 20 microns. Alternately, the intermediate layer 105B can be formed from a hard thin-film electrically-insulating ceramic material, such as silicon oxide, aluminum oxide, silicon nitride, titanium nitrate, titanium oxide, zirconium tetrafluoride and combinations thereof. The hardness of the thin-film ceramic material can be in the range of shore 40D to shore 80D or higher. The thickness of the thin-film ceramic material can range from 0.1 microns to 1 micron. Alternatively, the intermediate layer 105B can be formed from a thin film of conductive material (such as the same or different conductive polymer as that of 105A). The intermediate layers 105A and 105B encapsulate the transformative material 107 (or aqueous solution of silver nitrate and soluble nitrates like zinc nitrate, lithium nitrate, sodium nitrate) between the first and second conductive layers 101, 103 as shown. The intermediate layer 105A can extend laterally beyond the intermediate layer 105B and the second conductive layer 103 as shown. The first conductive layer 101 can cover the transformative material 107 as shown and is typically positioned facing the package product and closest to the packaged product, while the second conductive layer 103 is typically positioned facing away from the package product and furthest from the packaged product.

Note that in this configuration the conductive material of the intermediate layer 105A can be selected such that it does not undergo a galvanic displacement reaction with the silver metal ion solution (e.g., an aqueous solution of silver nitrate and soluble nitrates like zinc nitrate, lithium nitrate, sodium nitrate that precipitates solid-phase silver). In this configuration, the metal(s) of the first conductive layer 101 would undergo a galvanic displacement reaction with metal ions of the metal ion solution if in contact with the metal ion solution, but it is inhibited from doing so by the intervening intermediate layer 105A. Furthermore, the material of the intermediate layer 105B can be selected such that it does not undergo a galvanic displacement reaction with the metal ion solution that precipitates the solid-phase metal. In this configuration, the metal(s) of the second conductive layer 103 would undergo an irreversible galvanic displacement reaction with metal ions of the metal ion solution if in contact with the metal ion solution, but it is inhibited from doing so by the intervening intermediate layer 105B.

Figure 2A:
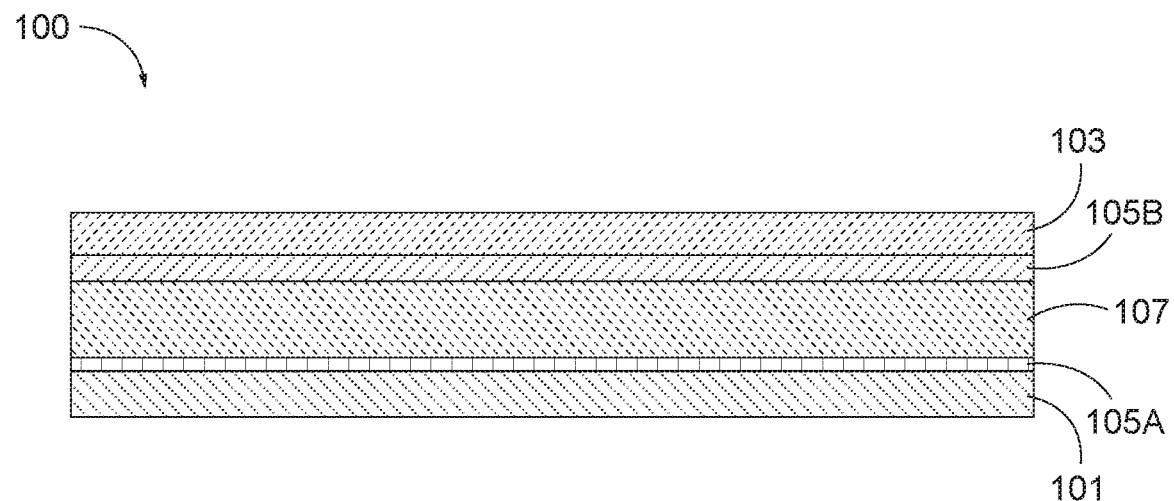
FIGS. 2A-2D are schematic views of an exemplary intrusion or perforation through the multilayer laminate structures of FIGS. 1A-C and the galvanic displacement reaction and resulting structural and electrical changes to the multilayer laminate structure that result from such intrusion.

Note that under normal conditions absent an intrusion or perforation, the multilayer laminate structure 100 has a configuration that provides a relatively high impedance electrical current path between the first and second conductive layers 101 and 103 as shown in FIG. 2A. However, in response to an intrusion or perforation, the multilayer laminate structure 100 automatically reconfigures itself to a different configuration where metal ions of the metal ion solution (or aqueous solution of silver nitrate and soluble nitrates like zinc nitrate, lithium nitrate, sodium nitrate) precipitate to form solid-phase metal (e.g., silver) that provides part or all of a relatively low impedance electrical current path between the first and second conductive layers 101 and 103 as shown in FIGS. 2B to 2D.

Figure 2B:
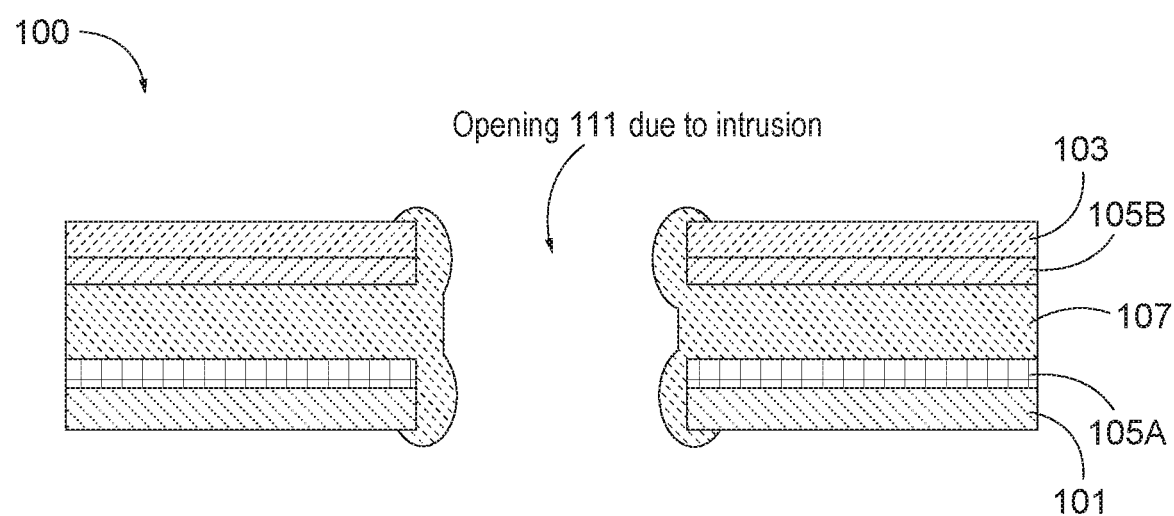
Figure 2C:
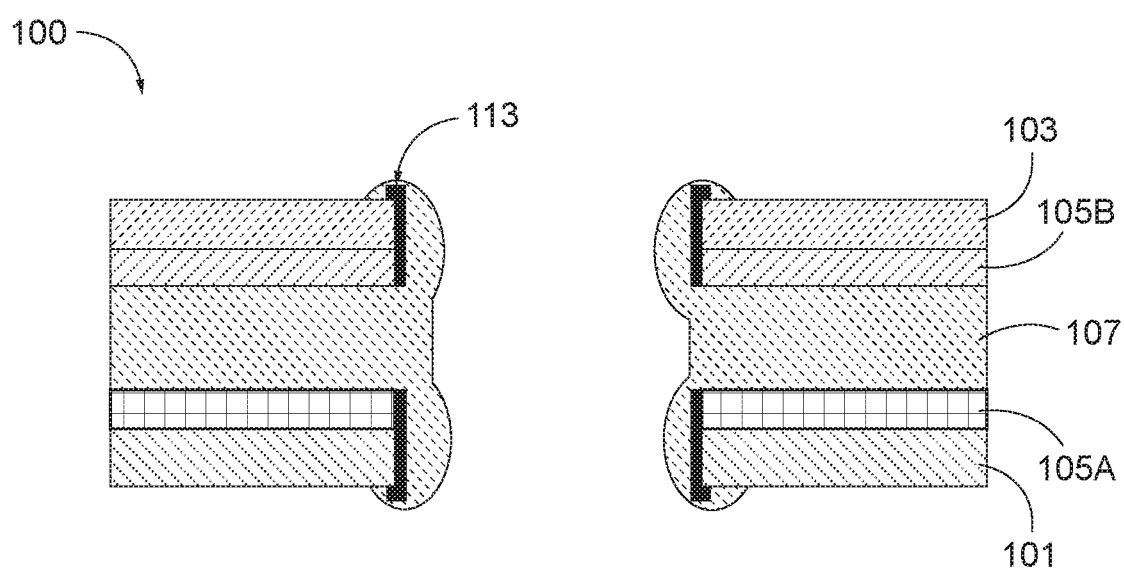

More specifically, an intrusion or perforation can form an opening 111 that extends completely through the first and second conductive layers 101, 103 of the multilayer laminate structure as shown in FIG. 2B. In response to such intrusion or perforation, the metal ion solution (or aqueous solution of silver nitrate and soluble nitrates like zinc nitrate, lithium nitrate, sodium nitrate) can be displaced (or flow) through this opening 111 and contact both the first and second conductive layers 101, 103 as shown. The metal ion solution (or aqueous solution of silver nitrate and soluble nitrates like zinc nitrate, lithium nitrate, sodium nitrate) by itself is conductive. Thus, if sufficient metal ion solution is present in the space between the first and second conductive layers 101 and 103, the initial displacement (flow) of the metal ion solution (or aqueous solution of silver nitrate and soluble nitrates like zinc nitrate, lithium nitrate, sodium nitrate) can form all or part of a low impedance current path between the first and second conductive layers 101 and 103.

Furthermore, with the metal ion solution (or aqueous solution of silver nitrate and soluble nitrates like zinc nitrate, lithium nitrate, sodium nitrate) in contact with the appropriate metal(s) of the first and second conductive layers 101 and 103, the metal ion solution (or aqueous solution of silver nitrate and soluble nitrates like zinc nitrate, lithium nitrate, sodium nitrate) can undergo a galvanic displacement reaction that precipitates solid-phase metal (e.g., silver) in response to the intrusion. The solid-phase metal (e.g., silver) precipitate 113 can extend from the second conductive layer 103 through the adjacent intermediate layer 105B as shown in FIG. 2C. The metal ion solution 107 by itself is conductive. Thus, if sufficient metal ion solution 107 (or aqueous solution of silver nitrate and soluble nitrates like zinc nitrate, lithium nitrate, sodium nitrate) is present in the space between the deposited solid-phase metal (e.g., silver) and the intermediate layer 105A or the first conductive layer 101, the solid-phase metal precipitate (e.g., silver) in conjunction with the metal ion solution (or aqueous solution of silver nitrate and soluble nitrates like zinc nitrate, lithium nitrate, sodium nitrate) can form all or part of a relatively low impedance electrical current path between the first and second conductive layers 101 and 103.

Figure 2D:
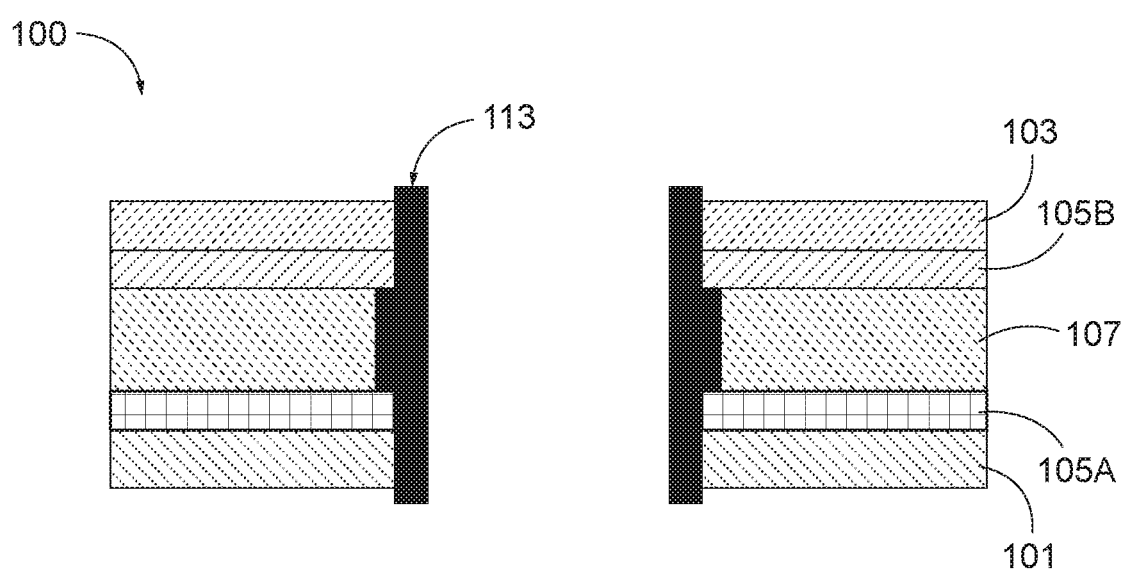

Moreover, the precipitation of the solid-phase metal (e.g., silver) can continue such that the solid-phase metal precipitate extends between first and second conductive layers 101 and 103 as shown in FIG. 2D. In this manner, the solid-phase metal precipitate alone (e.g., silver) 113, without any conductive metal ion solution (or aqueous solution of silver nitrate and soluble nitrates like zinc nitrate, lithium nitrate, sodium nitrate), can form all or part of a relatively low impedance electrical current path between the first and second conductive layers 101 and 103.

In this manner, the multilayer laminate structure 100 can function under normal conditions as a flexible two-plate capacitor with the first and second conductive layers equivalent to the two plates of the capacitor, and the encapsulated metal ion solution 107 equivalent to the dielectric medium between the two plates. As a two-plate capacitor, the multilayer laminate structure 100 provides a relatively high impedance electrical current path between the first and second conductive layers 101 and 103. In response to the intrusion or perforation, the metal ion solution can flow or undergo a galvanic reaction that provides part or all of a relatively low impedance electrical current path between the first and second conductive layers 101 and 103.

Figure 3A:
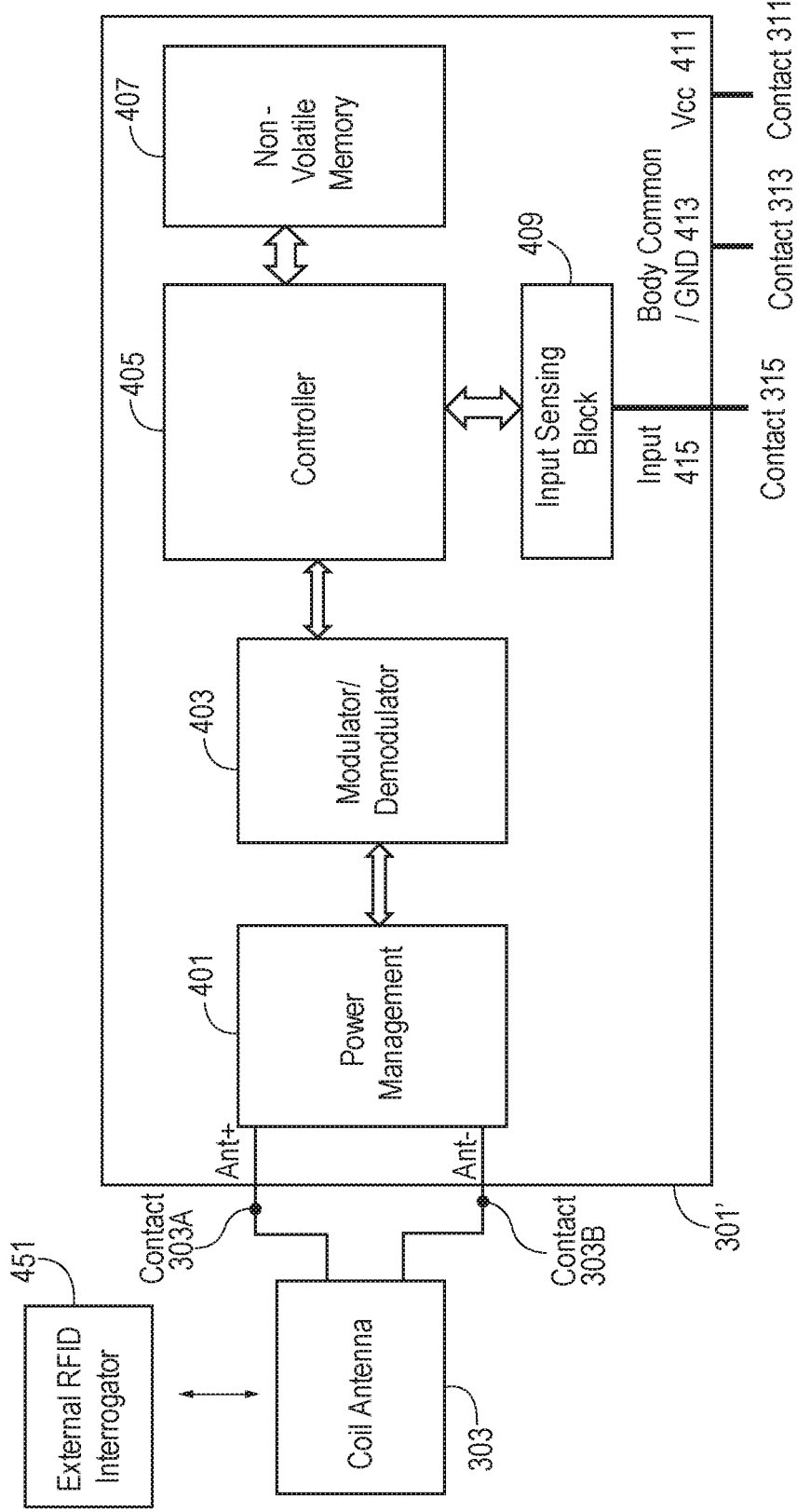
FIG. 3A is a functional block diagram of an NFC/RFID integrated circuit and coil antenna with electrical interconnection between terminals of the NFC/RFID integrated circuit and a multilayer laminate structure.
Figure 4A:
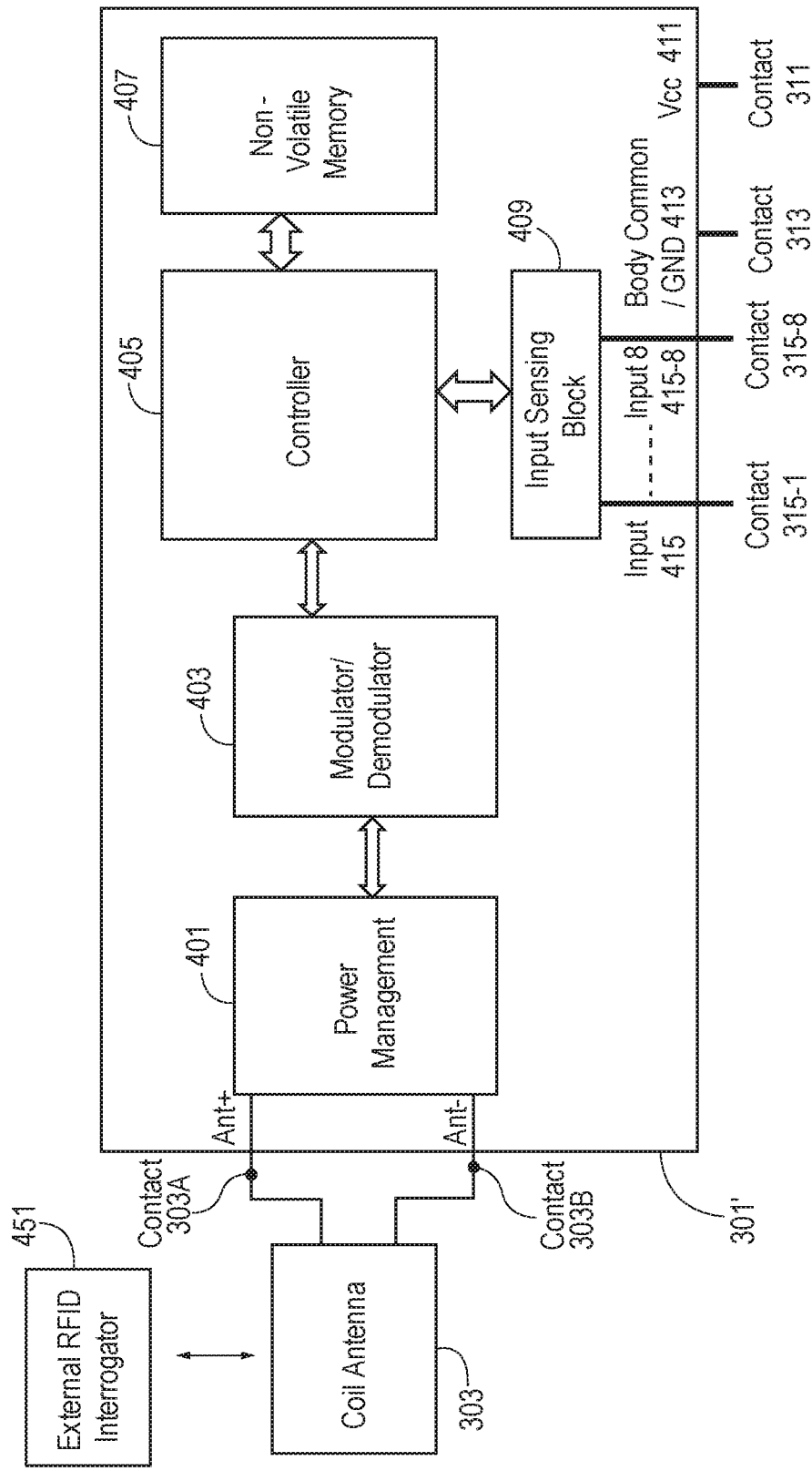
FIG. 4A is a functional block diagram of an NFC/RFID integrated circuit and coil antenna with electrical interconnection between terminals of the NFC/RFID integrated circuit and elongate fingers of the multilayer laminate structure of FIG. 4B.
Figure 4B:
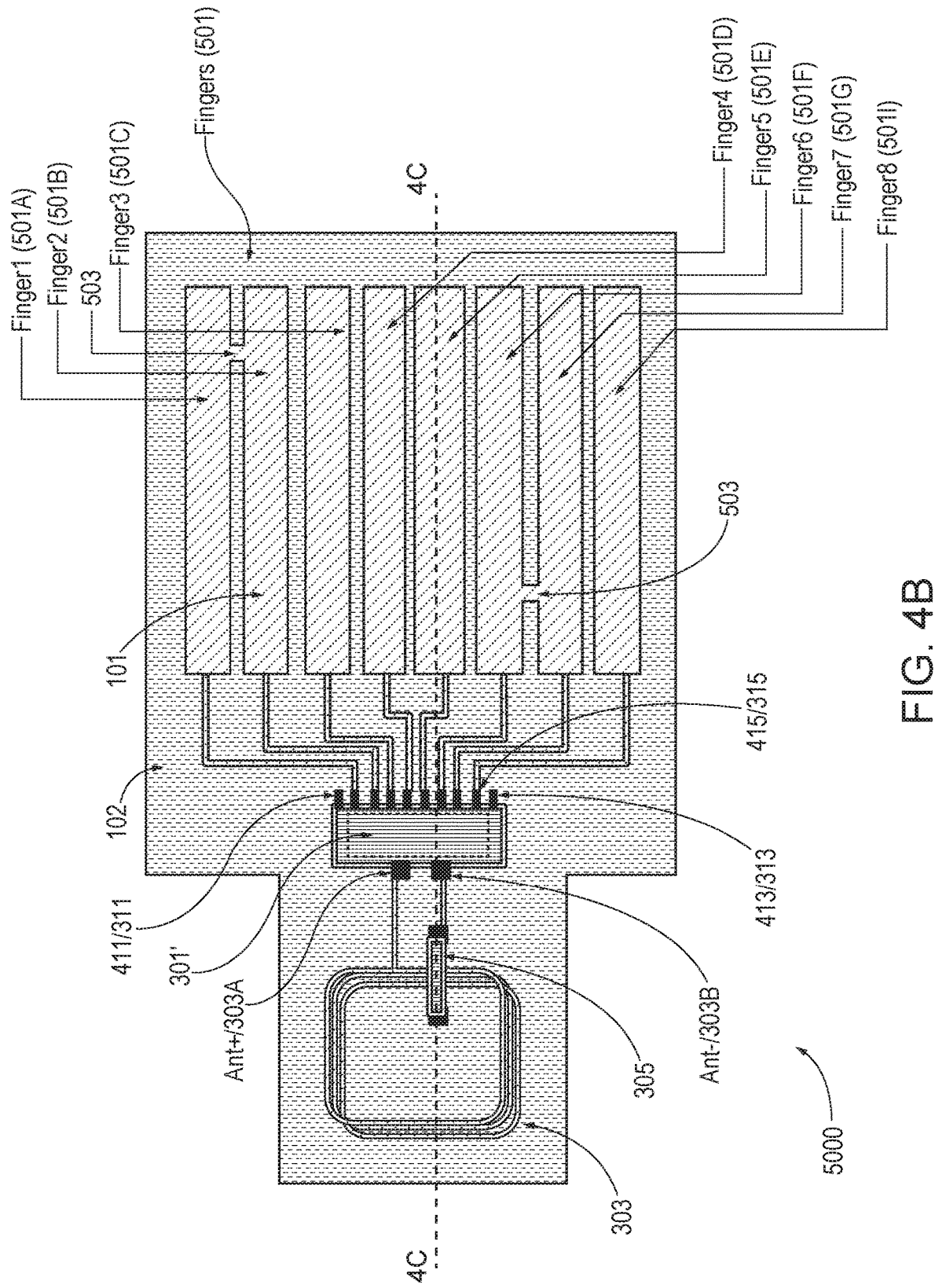
FIG. 4B is a schematic top view of an example packaging system or tag that employs the multilayer laminate structure of FIGS. 1A-1C together with an NFC/RFID integrated circuit and coil antenna.

FIG. 3A illustrates an NFC/RFID integrated circuit 301 that can be mechanically and electrically coupled to the multilayer laminate structure 100 as part of a packaging system or tag as described herein. The NFC/RFID integrated circuit 301 includes two coil input terminals (Ant+, Ant−), a Vcc terminal 411, a GND or Body Common terminal 413, and an input terminal 415. The two coil input terminals (Ant+, Ant−) of the NFC/RFID integrated circuit 301 are electrically interconnected to two antenna contacts 303A, 303B of the coil antenna 303 by a suitable interconnect structure (such as ball-type interconnect). The other terminals of the NFC/RFID integrated circuit 301 are connected to different parts of the multilayer laminate structure and other circuit components as follows. First, the input terminal 415 is electrically interconnected to a contact 315 formed by a patterned conductive layer 101 by a suitable interconnect structure (such as ball-type structure), which provides electrical connection between the input terminal 415 and the detection surface 111 formed by the patterned conductive layer 101. Second, the Vcc terminal 411 is electrically interconnected to a contact 311 formed by the patterned conductive layer 101 by a suitable interconnect structure (such as ball-type structure). A pull-up resistor $R_{pu}$ is electrically connected between contact 311 and contact 313 formed by the patterned conductive layer 101 such that the pull-up resistor $R_{pu}$ is electrically connected between the Vcc terminal 411 and the input terminal 415 as shown in FIG. 4B. The pull-up resistor $R_{pu}$ can be interconnected to the contacts 311, 313 or terminals 411, 415 by conductive traces (e.g., layer 101) or by soldered insulating wires or other suitable means. Finally, the GND or Body Common terminal 413 is electrically interconnected to a contact 313 formed by the patterned conductive layer 101 by a suitable interconnect structure (such as ball-type structure). A connector 417, which can be a soldered insulating wire or other suitable means, provides electrical connection between the contact 311 and the second conductive layer 103, and thus provides electrical connection between the GND or Body Common terminal 413 and the second conductive layer 103.

The NFC/RFID integrated circuit 301 can cooperate with the coil antenna 303 to exchange data with an external NFC/RFID interrogator (or reader) 451 using radio frequency (RF) signals as is well known. The NFC/RFID integrated circuit 301 can include power management circuitry 401 that harvests and stores electrical power from the radio signals that are transmitted by the NFC/RFID interrogator and received by the coil antenna 303. Such electrical power can be regulated to one or more predefined voltage levels and supplied to one or more circuit elements of the NFC/RFID integrated circuit 301. The circuit elements can include modulator/demodulator circuitry 403 that demodulates the radio signals that are transmitted by the NFC/RFID interrogator 451 and received by the coil antenna 303 and that modulates radio signals that are transmitted by the coil antenna 303 to the NFC/RFID interrogator 451, a controller 405 and non-volatile memory 407 for processing and storing data, and an input sensing block 409 that is configured to receive an electrical signal supplied by the input terminal 411 for processing and storage as data by the controller 405. The Vcc terminal 411 can receive a positive DC voltage supply signal generated by one or more integrated galvanic cells as described herein. The GND or Common Body terminal 413 provides an external ground or common body reference potential signal.

In embodiments, the NFC/RFID integrated circuit 301 can be an integrated circuit package that is fabricated using semiconductor manufacturing processes. For example, the NFC/RFID integrated circuit 301 can be realized by commercially available NFC/RFID integrated circuits, such as the EM4325 RFID IC sold commercially by EM Microelectronic-Marin SA, the UCODE G2iM+ NFC IC sold commercially by NXP Semiconductors N.V or the SIC4310 NFC IC sold commercially by Silicon Craft Technology. Other suitable NFC/RFID integrated circuits can also be used. The RF signals communicated between the NFC/RFID integrated circuit 301 and the NFC/RFID interrogator 451 can conform to one or more standards. For example, ISO/IEC 14443, ISO/IEC 15693, ISO/IEC 118000 and EPC Global UHF Class 1 Generation 2 are common standards supported by NFC/RFID integrated circuits and NFC/RFID interrogators.

Figure 3B:
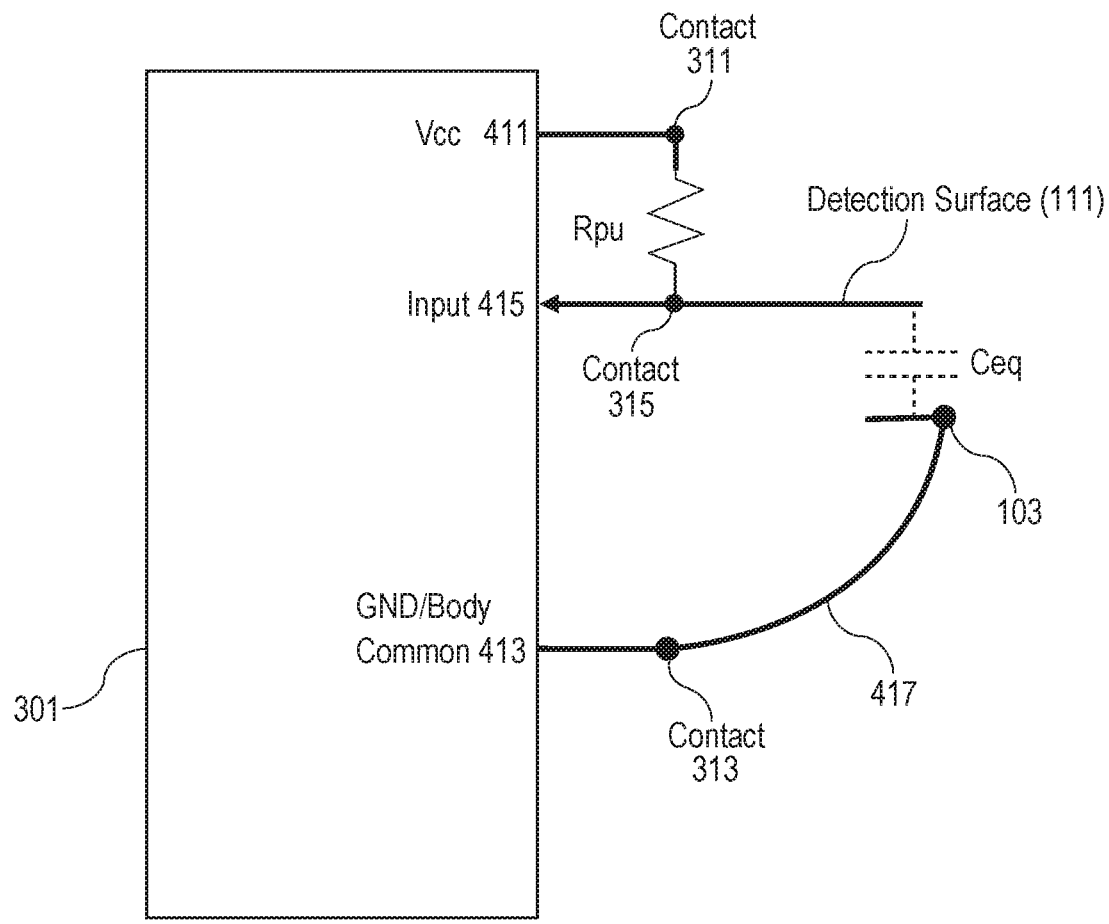
FIG. 3B is a functional block diagram showing electrical interconnection between certain terminals of the NFC/RFID integrated circuit and the multilayer laminate structure.

In the embodiment shown in FIG. 3B, the detection surface 111 is electrically coupled to a corresponding input terminal 415 of the NFC/RFID integrated circuit 301. Under normal conditions absent an intrusion or perforation in the detection surface 111, the multilayer laminate structure provides an effective capacitance $C_{eq}$ (a relatively high impedance electrical current path) between the detection surface 111 and the second conductive surface 103. When an intrusion or perforation occurs in the detection surface 111, the transformative material 107 of the multilayer laminate structure can adapt to provide all or part of a relatively low impedance electrical current path between the detection surface 111 and the other conductive layer 103. Specifically, the capacitance $C_{eq}$ is transformed to a low-resistance $R_{eq}$. Thus, the voltage signal at the input terminal 415 becomes $Vcc*R_{eq}/(R_{pu}+R_{eq})$, where $R_{pu}$ is the resistance of the pull-up resistor $R_{pu}$. By choosing the appropriate $R_{pu}$, the voltage signal at the input terminal 415 sensed for an intrusion or perforation will be less than a predefined threshold voltage, which allows for discrimination between the relatively high impedance electrical current path between the detection surface 111 and the second conductive surface 103 (absent an intrusion or perforation) and the relatively low impedance electrical current path between the detection surface 111 and the second conductive surface 103 (caused by an intrusion or perforation).

In response to one or more commands issued by the external NFC/RFID interrogator 451, the input sensing block 409 of the NFC/RFID integrated circuit 301 can be configured to sense and detect the voltage signal at the input terminal 415, discriminate between the relatively high impedance electrical current path between the first and second conductive layers (absent any intrusion or perforation) and the relatively low impedance electrical current path between the first and second conductive layers (caused by an intrusion or perforation) by comparing the voltage signal to a threshold level or other signal processing, and register data that represents the relatively high impedance electrical current path (or relatively low electrical current path) for the detection surface 111 based on such discrimination. The controller of the NFC/RFID integrated circuit 301 can process the registered data in order to detect that an intrusion or perforation has occurred, and output a signal indictor based thereon for communication to the external NFC/RFID interrogator 451. For example, if the detected voltage signal and resulting data value corresponds to the relatively high impedance electrical current path between the first and second conductive layers (absent any intrusion or perforation in the detection surface 111), the controller can output an "intrusion detection pass" signal for communication to the external NFC/RFID interrogator 451 where the "intrusion detection pass" signal indicates the absence of suspected tampering by intrusion or perforation of the packing system. In another example, if the detected voltage signal and resulting data value corresponds to the relatively low impedance electrical current path between the first and second conductive layers (caused by an intrusion or perforation in the detection surface 111), the controller can output an "intrusion detection fail" signal for communication to the external NFC/RFID interrogator 451 where the "intrusion detection fail" signal indicates the presence of suspected tampering by intrusion or perforation of the packing system. The external NFC/RFID interrogator 451 can analyze the data communicated from the NFC/RFID integrated circuit 301 to interpret the data as a signal of the intrusion or perforation (for example, by comparing the data to the expected data value(s) representing an intrusion or non-intrusion event), and output an indication (e.g., visual or audible notification) of the intrusion or perforation if and when detected.

In embodiments, the transformative material of the multilayer laminate structure can include a metal ion solution (or aqueous solution of silver nitrate and soluble nitrates like zinc nitrate, lithium nitrate, sodium nitrate) that is displaced (or flows) or undergoes a galvanic displacement reaction that precipitates solid-phase metal (e.g., silver) in response to intrusion through the multilayer laminate structure, where the displacement or the precipitation of the solid-phase metal or both changes the impedance between the first and second conductive layers to form a relatively low impedance electrical current path between the first and second conductive layers of the multilayer laminate structure.

According to the present disclosure, the multilayer laminate structure as described herein can be adapted to form a set of distinct sections or fingers. One or more pairs of fingers in the set are electrically connected to one another by metal traces or wires or other suitable conductive material, while the other pairs of fingers in the set are electrically-disconnected from one another by insulating material, insulating void space or other suitable insulating material. The set of fingers can be electrically coupled to corresponding input terminals of an NFC/RFID integrated circuit, which is also coupled to a coil antenna and integrated as part the packaging system or tag. In response to one or more commands communicated by an external reader, the NFC/RFID integrated circuit can be configured to sense and decode voltage signals received at its input terminals. The electrical connection(s) and disconnection(s) of the fingers and the interconnection of the fingers to the input terminals of the NFC/RFID integrated circuit are dictated by the known design and manufacture of the packaging system or tag. The particular design will produce voltage signals at the input terminals of the NFC/RFID integrated circuit that decode to a predefined codeword. This predefined codeword is associated with genuine packaged goods and is used to distinguish the genuine packaged goods from counterfeit or falsified goods.

More specifically, an attempt to copy the packaging design for counterfeit or falsified goods will require that the copy replicate the electrical connection(s) and disconnection(s) of the finger pairs and the interconnection of the fingers to the input terminals of the NFC/RFID integrated circuit. Such replication can be made very difficult to accomplish (for example, by obfuscating or hiding the interconnection between fingers and by laying out and interconnecting the fingers in a complex or random pattern), and failure to do so will produce voltage signals at the input terminals of the NFC/RFID integrated circuit that do not decode to the predefined codeword. The NFC/RFID integrated circuit can be configured to detect and register mismatch between the predefined codeword and the codeword detected by sensing and decoding the voltage signals received at the input terminals of the NFC/RFID integrated circuit, and output a signal indictor based thereon for communication to the NFC/RFID interrogator. For example, the signal indicator can indicate the absence of suspected counterfeit or falsified goods in the event that the voltage signals produced at the input terminals of the NFC/RFID integrated circuit do decode to the predefined codeword. In another example, the signal indicator can indicate the presence of suspected counterfeit or falsified goods in the event that the voltage signals produced at the input terminals of the NFC/RFID integrated circuit do not decode to the predefined codeword.

FIGS. 4A-4D illustrate a method of forming a packaging system or tag that includes a multilayer laminate structure that includes a set of distinct sections or fingers with an NFC/RFID integrated circuit 301' that is electrically coupled to a coil antenna 303. In this embodiment, the NFC/RFID integrated circuit 301' is similar to the NFC/RFID integrated circuit 301 as described above with respect to FIG. 4A; however, the input sensing block 409 of the NFC/RFID integrated circuits 301' includes multiple input terminals 415, such as eight input terminals 415-1, 415-2, . . . 415-8 as shown in FIG. 4A. In this configuration, the input sensing block 409 can be configured to sense and detect the voltage signals at each one of the multiple input terminals 415.

Figure 4C:
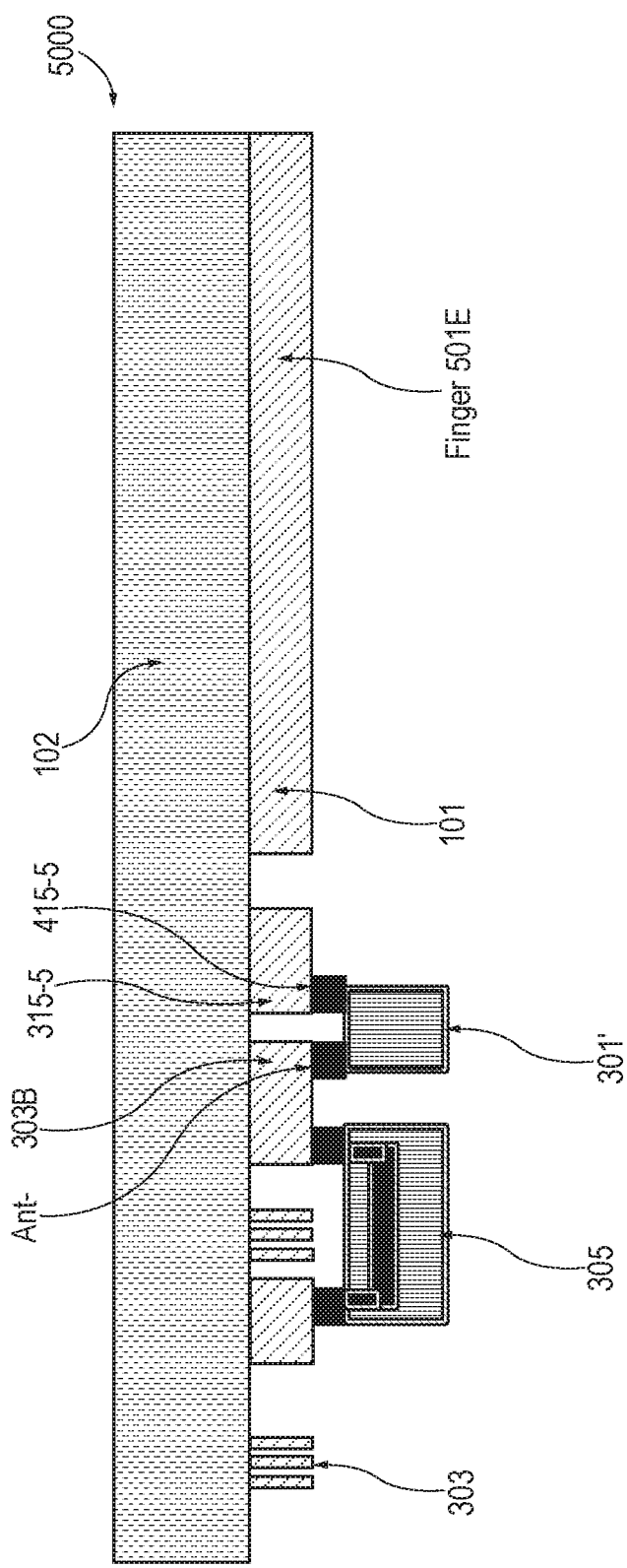
FIGS. 4C and 4D are schematic diagrams that illustrate a method of forming the packaging system of FIG. 4B.

Furthermore, the first conductive layer 101 is formed on a flexible electrically-insulating substrate 102 and patterned to define local features formed from the first conductive layer 101. As best shown in FIGS. 4B and 4C, the local features can include one or more loops of the coil antenna 303, antenna contacts 303A, 303B and corresponding interconnects that support a jumper 305 over the loops of the coil antenna 303, input contacts 315 and interconnects that extend to a corresponding set of fingers 501 (for example, eight fingers 501A . . . 501H) that are electrically coupled to the corresponding inputs contacts and corresponding input terminals of the NFC/RFID integrated circuits 301' as shown, and a Vcc contact 311 and ground or common body contact 313 for the NFC/RFID integrated circuit 301'.

In embodiments, the patterned first conductive layer 101 with such local features can be formed by suitable printing technologies, such as continuous gravure or rolled based printing, roll-to-roll printing, stamp printing or inkjet printing. Various microprinting and/or etching technologies can also be used if desired. The NFC/RFID integrated circuit 301' can then mounted or interconnected to the patterned conductive layer 101 using suitable interconnect structures (such as ball-type interconnects). In this configuration, the input contact 315, the two antenna contacts 303A and 303B, the Vcc contact 311, and the ground or common body contact 313 are configured to interconnect to corresponding terminals of the NFC/RFID integrated circuit 301' as shown in FIG. 4C.

Figure 4D:
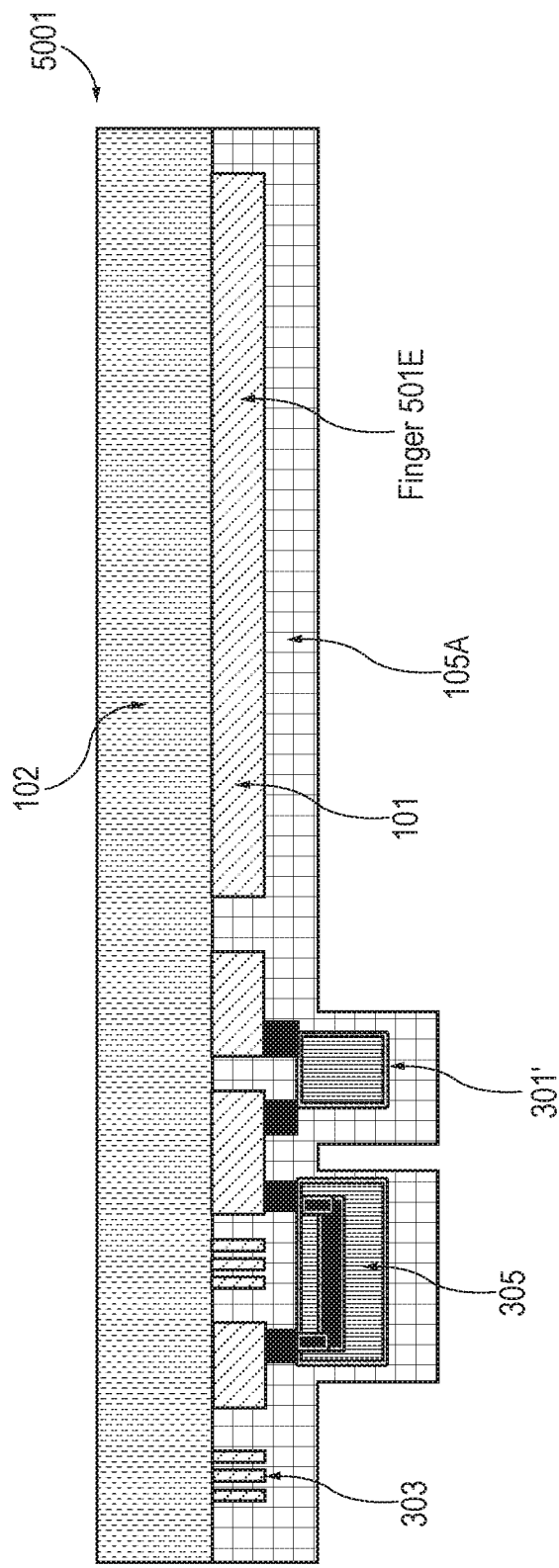

The patterned first conductive layer 101 with the NFC/RFID integrated circuit 301' mounted and interconnected thereon is then covered by the electrically-insulating intermediate layer 105A to form a resultant structure 531 as shown in FIG. 4D. In embodiments, the intermediate layer 105A can be formed from a thin film of electrically-insulating material such as polyethylene terephthalate (PET), Polyethylene (PE), Polyimide (Kapton), photo-resist polymer, Mylar, a spun polymer with a metallic oxide coating, or other suitable encapsulating or insulating material.

Separately, a multilayer structure can be formed that includes the transformative material 107, intermediate layer 105B and conductive layer 103. The multilayer structure 533 is similar to the multilayer laminate structure of FIGS. 1A-1C with the first conductive layer 101 and intermediate layer 105A removed. In embodiments, the multilayer structure can be formed by suitable printing technologies, such as continuous gravure or rolled based printing, roll-to-roll printing, stamp printing or inkjet printing. Various microprinting technologies can also be used if desired. The multilayer structure 533 can then be bonded (for example with a thin adhesive layer) or otherwise joined to the structure 531 such that the transformative material 107 is encapsulated by the intermediate layers 105A, 105B in the area that underlies the set of fingers (e.g., fingers 501A . . . 501H). In this configuration, the transformative material 107 can be configured to change impedance between the particular finger of the set and the other conductive layer 103 in response to a perforation in the particular finger. The layers of the bonded laminate structure may be thin flexible sheets such that the bonded laminate structure is flexible in nature and thus is able to bend or fold.

Figure 5:
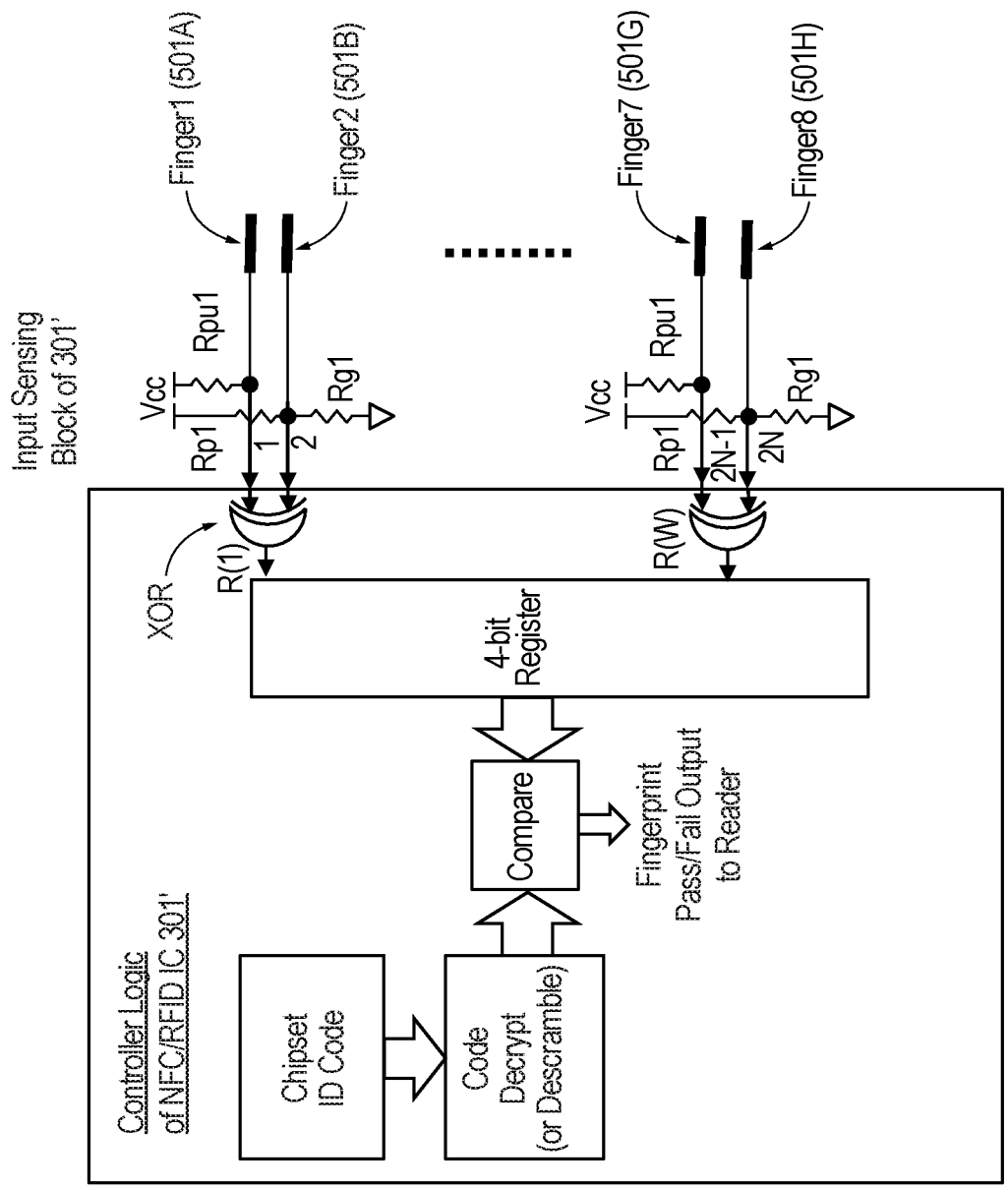
FIG. 5 is a schematic block diagram showing functionality that can be part of the NFC/RFID integrated circuit of FIG. 4A together with the electrical circuitry of the packaging system that interfaces to the NFC/RFID integrated circuit.

In embodiments, a network of resistors $R_{pu1}$, $R_{p1}$ and $R_{g1}$ can be electrically coupled between adjacent finger pairs and the corresponding input terminals of the NFC/RFID integrated circuit 301' as shown in FIG. 5. For each adjacent finger pair, the resistors $R_{pu1}$ and $R_{p1}$ are electrically coupled between the Vcc terminal 411 of the NFC/RFID integrated circuit 301' and both corresponding fingers of the pair (e.g., fingers 501A and 501, or fingers 501G and 501H as shown), and the resistor $R_{g1}$ is electrically coupled between the common body or ground terminal 413 of the NFC/RFID integrated circuit 301' and the one finger of the pair (e.g., finger 501B for the pair 501A, 501B, or finger 501H for the pair 501G, 501H as shown).

In embodiments, the values for the resistors $R_{pu1}$, $R_{p1}$ and $R_{g1}$ of the resistor networks can be selected such that the parallel resistance of $R_{pu1}$ and $R_{p1}$ ($R_{pu1}//R_{p1}$) is less than $R_{g1}$, and $R_{g1}$ is less than $R_{pu1}$. These conditions can provide voltage signals at the input terminals of the NFC/RFID integrated circuit 301' for the corresponding pairs of fingers that allows for discrimination and registration of the interconnection state (or disconnection state) of the corresponding finger pair.

For example, consider an example where the Vcc terminal 411 of the NFC/RFID integrated circuit 301' produces a DC supply voltage signal Vcc of 2V, $R_{pu1}$ and $R_{p1}$ are given as 100 Kohms, and $R_{g1}$ is given as 75 Kohms. In this case, the parallel resistance ($R_{pu1}//R_{p1}$) is 50 Kohms, which is less than the 75 Kohms of $R_{g1}$, and the 75 Kohms of $R_{g1}$ is less than the 100 Kohms of $R_{pu1}$. When an adjacent pair of fingers is electrically connected to one another, the voltage signal produced that the corresponding input terminals of the NFC/RFID integrated circuit 301' is expected to be 1.2 volts. This voltage signal is common for both input terminals and is due to the voltage drop from Vcc due to the parallel resistance ($R_{pu1}//R_{p1}$) in series with the resistor $R_{g1}$. The parallel resistance ($R_{pu1}//R_{p1}$) results from the electrical connection of the finger pair. However, when an adjacent pair of fingers is electrically-disconnected from one another, the voltage signal produced that the corresponding input terminals of the NFC/RFID integrated circuit 301' changes. Specifically, for the input terminal that is electrically coupled to a finger of the pair and both resistors $R_{p1}$ and $R_{g1}$ (e.g., finger 501B or finger 501H), the voltage signal is expected to be 0.86 volts. This voltage signal is due to the voltage drop from Vcc due to the resistance $R_{p1}$ in series with resistor $R_{g1}$. And for the input terminal that is electrically coupled to the other finger of the pair and only the pull-up resistor $R_{pu1}$ (e.g., finger 501A or finger 501G), the voltage signal is expected to be 2 volts.

Note that the area covered by the fingers (e.g., fingers 501A . . . 501H) is generally rectangular in shape. However, in other embodiments, the area covered by the fingers (e.g., fingers 501A . . . 501H) can be any other arbitrary sharp, including linear shapes and non-linear shapes. In embodiments, the area covered by the fingers (e.g., fingers 501A . . . 501H) can be configured such that the set of fingers encompass a part, all or nearly all of the area of a sensing barrier provided by the packaging system or tag.

In embodiments, the NFC/RFID integrated circuit 301' can include non-volatile memory and a controller (or other electronic circuitry). The non-volatile memory of the NFC/RFID integrated circuit 301' can be configured to store code data (labeled as Chipset ID code in FIG. 5) that can be read by the controller and processed (for example, by decrypting or descrambling the code data) to reproduce the predefined codeword associated with the genuine goods protected by the packaging system or tag. In response to command(s) issued by the external NFC/RFID interrogator, the controller can read the code data stored in the non-volatile memory and reproduce the predefined codeword as shown in FIG. 5. In conjunction with such processing, the NFC/RFID integrated circuit 301' can sense the voltage signals produced at the input terminals of the NFC/RFID integrated circuit 301', decode the signals using XOR logic gates to generate a sensed codeword, and store the sensed codeword in a register (e.g., the 4-bit register of FIG. 5). The controller can compare the sensed codeword stored in the register to the predefined codeword as reproduced from the stored code data, and output a signal indictor based on the results of the comparison for communication to the external NFC/RFID interrogator as shown in FIG. 5. For example, if the sensed codeword matches the predefined codeword, the controller can output a "fingerprint pass" signal for communication to the NFC/RFID interrogator where the "fingerprint pass" signal indicates the absence of suspected counterfeit or falsified goods. In another example, if the sensed codeword does not match the predefined codeword, the controller can output a "fingerprint fail" signal that indicates the presence of suspected counterfeit or falsified goods. In this manner, the operational characteristic of the NFC/RFID integrated circuit 301' can be ascertained and analyzed (for example, by suitable operations of an external NFC/RFID interrogator) to detect and register suspected counterfeit or falsified goods of the packaging. Note that the functionality of the controller can also be carried out by suitable signal processing and logic circuits.

In this embodiment, a network of resistors $R_{pu1}$, $R_{p1}$ and $R_{g1}$ (or other suitable electrical circuit components) together with the electrical connections or disconnections between the fingers of the packaging system or tag can provide an input vector signal to the input terminals of the NFC/RFID integrated circuit 301'. This input vector signal can be derived by sampling the voltage signals produced by the fingers at the same time, or by sampling a sequence of the fingers over time (for example, using multiplexer circuitry or a configurable cross-connect that is part of the NFC/RFID integrated circuit 301 located internally in the chipset). The input vector signal can then be decoded to determine the sensed codeword, and the sensed codeword can be compared to the predefined codeword in order to generate and output the appropriate output signal as described herein. In practice, there are many ways that the decode circuitry of the NFC/RFID integrated circuit 301' can be designed to obfuscate the predefined codeword maintained by the NFC/RFID integrated circuit 301' in order to make it difficult to be reverse engineered. In short, the decode circuitry can be modeled as a function F(V) of the input vector V={V1_input, . . . Vn_input}—the voltage levels of the fingers. The decode circuitry can be further complicated by making it a sequence of functions Fn which outputs a different value for the same input vector in some pseudo-random fashion, each time it is read. For example, the sequence of functions Fn(V) can be determine by a counter which keeps count of how many times the device is read. Even further complexity can be introduced by public private key encryption or other suitable methods, if so desired.

The predefined codeword can be assigned to a particular packaged item and the corresponding data can be loaded into the NFC/RFID integrated circuit 301' of the packaging system or tag for the particular packaged item. The assignment of the predefined codeword to the particular packaged item can be varied based on application. For example, the assignment of the predefined codeword to the particular packaged item can be based on product model number, unique serial number, lot or batch number, manufacturing facility, etc. Secondary data analysis operations, for example data analysis operations performed in the cloud or other trusted computing environment, can be used to analyze the data read from the NFC/RFID integrated circuit 301' of the packaging system or tag in order to verify or rule out counterfeiting of the particular packaged item.

According to the present disclosure, the multilayer laminate structure as described herein can be adapted wherein the conductive layer that provides the coil antenna and the fingers (FIG. 4B), or the detection surface(s) (FIGS. 1A and 1B), can be further configured (for example, by printing or etching) to provide a first electrode of at least one integrated galvanic cell. The opposed conductive layer can be configured to provide a second electrode of the at least one integrated galvanic cell. The at least one integrated galvanic cell is further provided by encapsulated electrolyte material and an ion bridge disposed between the opposed conductive layers. At least one NFC/RFID integrated circuit is mechanically secured to the multilayer laminate structure (for example, in space between the first and second conductive layers) and electrically coupled to the coil antenna, the at least one galvanic cell, and other parts of the opposed conductive layers of the multilayer laminate structure.

The at least one integrated galvanic cell can be configured to supply electrical power (in the form of at least one DC voltage signal) to the at least one NFC/RFID integrated circuit. The at least one NFC/RFID integrated circuit can be configured to use the electrical power supplied by the at least one integrated galvanic cell to power some or all of its on-chip circuitry. For example, one or more NFC/RFID integrated circuits can be configured to operate as part of an active tag that uses the electrical power supplied by the at least one integrated galvanic cell to power the circuitry of the NFC/RFID integrated circuit(s). In another example, one or more NFC/RFID integrated circuits can be configured to operate as part of a semi-passive tag (or battery-assisted passive tag) that uses the electrical power supplied by the at least one integrated galvanic cell to power some or all of the circuit functions of the NFC/RFID integrated circuit(s). In this embodiment, the NFC/RFID integrated circuit(s) can include electrical circuitry that harvests electrical power from the RF signal supplied by an external reader. In this case, the NFC/RFID integrated circuit(s) can be configured to cooperate with the antenna to receive and store electrical power from electromagnetic radiation emitted by the external reader. In another example, one or more NFC/RFID integrated circuits can be configured to operate as part of an active tag that uses the electrical power supplied by the at least one integrated battery cell to power the circuitry of the NFC/RFID integrated circuit(s) without recourse to harvesting power from the radiation emitted by the external reader.

Figure 6A:
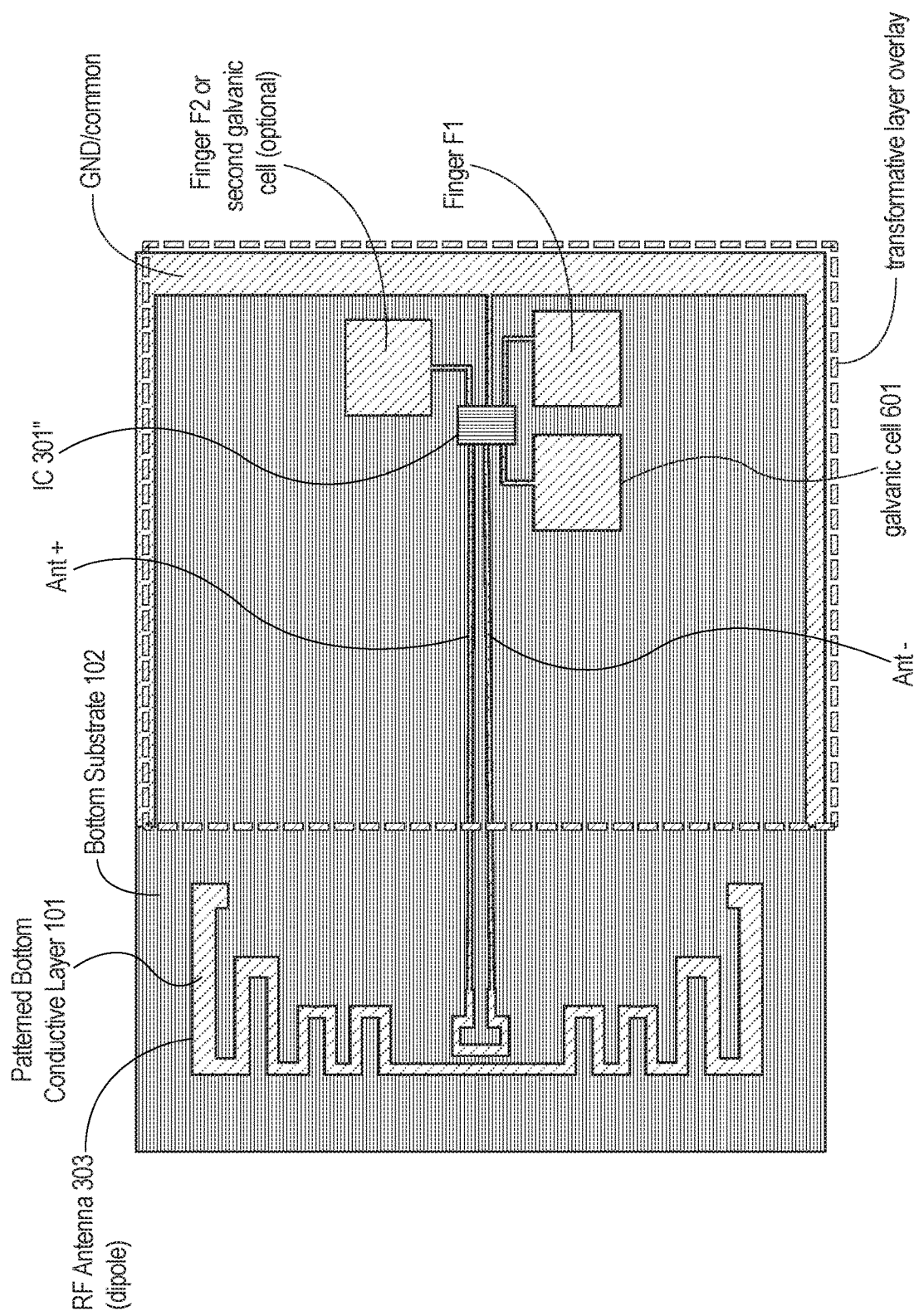
FIGS. 6A and 6B are schematic top views of an example packaging system or tag that employs an exemplary multilayer laminate structure together with an NFC/RFID integrated circuit and coil antenna and integrated galvanic cell.
Figure 6B:
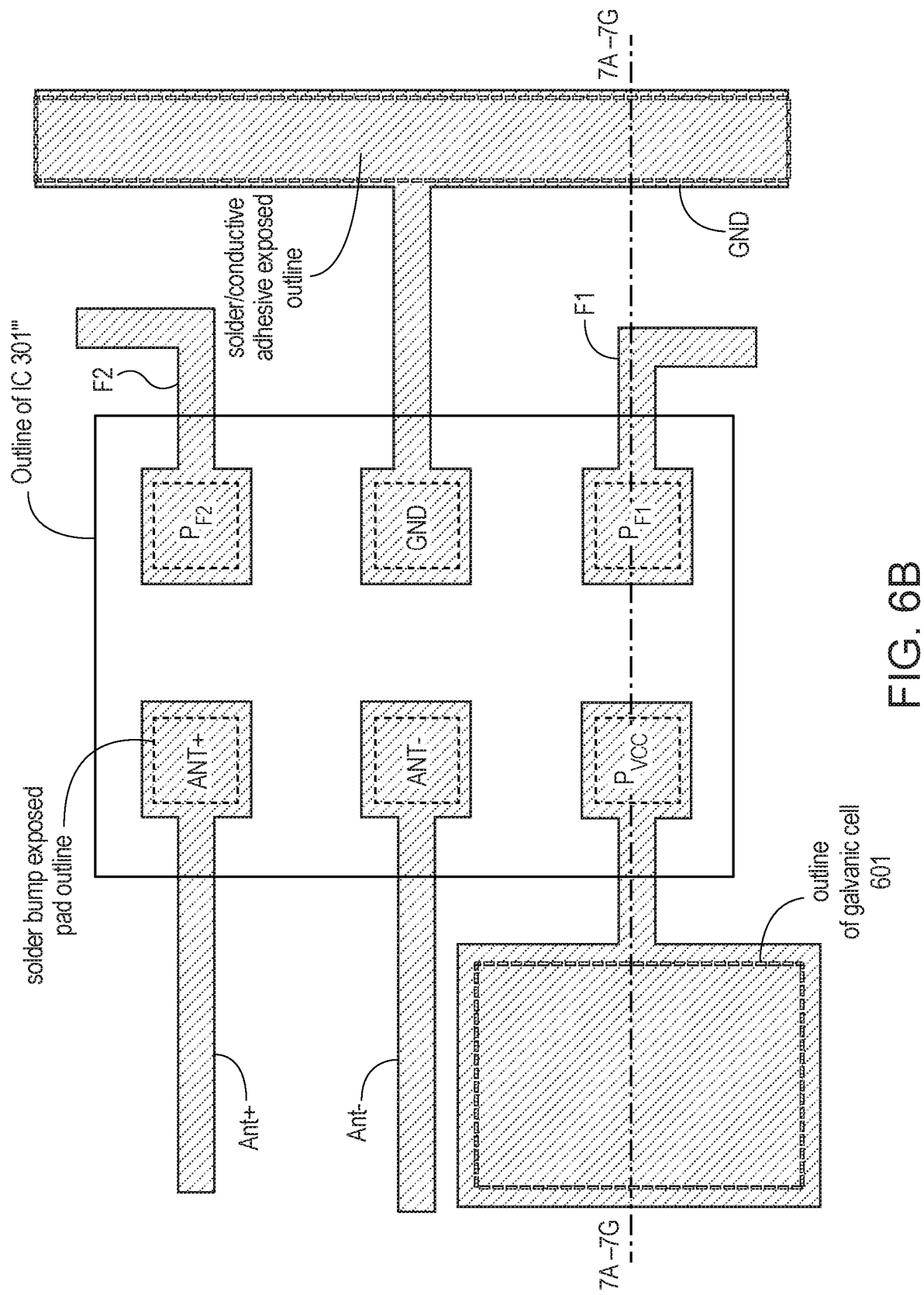

FIGS. 6A and 6B illustrate a packaging system or tag that includes a multilayer laminate structure that includes a set of distinct sections or fingers with an NFC/RFID integrated circuit 301" that is electrically coupled to an RF antenna 303 (for example, a thin film UHF dipole antenna as shown). In this embodiment, the NFC/RFID integrated circuit 301" is similar to the NFC/RFID integrated circuit 301' as described above with respect to FIG. 4A, which includes the input sensing block 409 can be configured to sense and detect the voltage signals from the fingers F1 and F2 at corresponding input terminals 415. In this embodiment, a bottom conductive layer 101 is formed on a flexible electrically-insulating substrate 102 and patterned to define local features formed from the bottom conductive layer 101. As best shown in FIGS. 6A and 6B, the local features can include one or more segments of the RF antenna 303, antenna contacts $P_{ANT+}$, $P_{ANT-}$ and corresponding interconnects that support a jumper over the loops of the coil antenna 303, input contacts $P_{F1}$, $P_{F2}$ and interconnects that extend to a corresponding set of fingers (for example, two fingers F1, F2) that are electrically coupled to corresponding input terminals 415 of the NFC/RFID integrated circuit 301", a $P_{Vcc}$ contact and interconnect that extends to an integrated galvanic cell 601 that is electrically coupled to the corresponding Vcc terminal 411 of the NFC/RFID integrated circuit 301", and a ground contact $P_{GND}$ and interconnect that extend to a ground or common body electrode GND that is electrically coupled to the corresponding ground terminal 413 of the NFC/RFID integrated circuit 301".

The patterned bottom conductive layer 101 provides a first electrode of the galvanic cell 601. An opposed conductive layer 103 can be configured to provide a second electrode of the galvanic cell 601. The galvanic cell 601 is further provided by encapsulated electrolyte material 603 and an ion bridge/separator disposed between the opposed conductive layers 101, 103. The galvanic cell 601 can be configured to supply electrical power (in the form of a DC voltage supply signal) to the NFC/RFID integrated circuit 301". The NFC/RFID integrated circuit 301" can be configured to use the electrical power supplied by the galvanic cell 601 to power some or all of its on-chip circuitry. For example, the NFC/RFID integrated circuit 301" can be configured to operate as part of a semi-passive tag (or battery-assisted passive tag) that uses the electrical power supplied by the galvanic cell 601 to power some circuit functions of the NFC/RFID integrated circuit 301". In this embodiment, the NFC/RFID integrated circuit 301" can include electrical circuitry that harvests electrical power from the RF signal supplied by an external reader. In this case, the NFC/RFID integrated circuit 301" can be configured to cooperate with the antenna 301 to receive and store electrical power from electromagnetic radiation emitted by the external reader. In another example, the NFC/RFID integrated circuit 301" can be configured to operate as part of an active tag that uses the electrical power supplied by the galvanic cell 601 to power the circuitry of the NFC/RFID integrated circuit 301". The galvanic cell 601 can also be configured to supply DC voltage signals to the circuitry of the fingers (or other detection surfaces for their respective sensing operations. Alternatively or additionally, electrical power harvested by the NFC/RFID integrated circuit 301" can be configured to supply DC voltage signals to the circuitry of the fingers (or other detection surfaces for their respective sensing operations.

FIGS. 7A-7G illustrate a method of forming the packaging system or tag of FIGS. 6A and 6B.

Figure 7A:
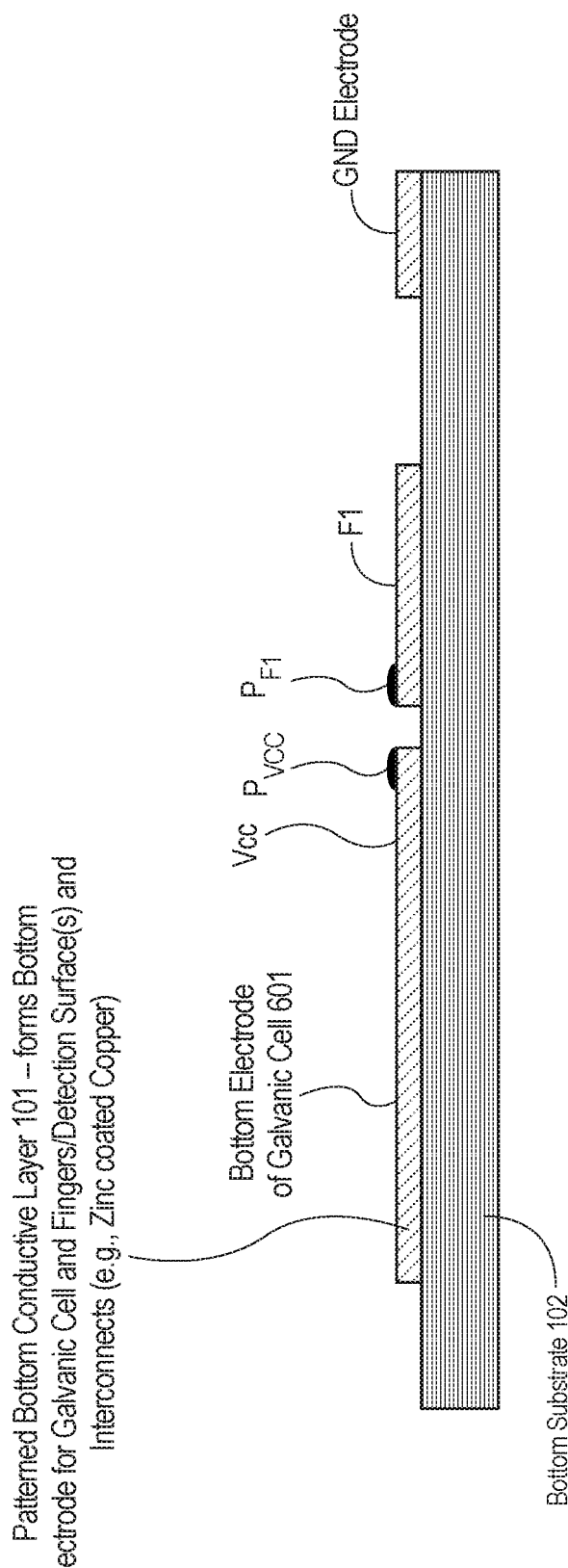
FIGS. 7A-7G are schematic diagrams illustrating a method of forming the exemplary packaging system of FIGS. 6A and 6B.

As shown in FIG. 7A, the bottom conductive layer 101 is formed on the flexible electrically-insulating substrate 102 and patterned to define local features formed from the bottom conductive layer 101. As best shown in FIGS. 7A, 6A and 6B, these local features include one or more segments of the RF antenna 303, antenna contacts $P_{ANT+}$, $P_{ANT-}$ with interconnects to the RF antenna 303, input contacts $P_{F1}$, $P_{F2}$ and interconnects that extend to a corresponding set of fingers (for example, two fingers F1, F2) that are electrically coupled to corresponding input terminals 415 of the NFC/RFID integrated circuit 301", a $P_{Vcc}$ contact and interconnect that extends to the bottom electrode of the galvanic cell 601 and electrically coupled to the corresponding Vcc terminal 411 of the NFC/RFID integrated circuit 301", and a ground contact $P_{GND}$ and interconnect that extend to a ground or common body electrode GND and electrically coupled to the corresponding ground terminal 413 of the NFC/RFID integrated circuit 301". The interconnects to the RF antenna 303 can possibly support a jumper (not shown) over loops of the RF antenna 303 depending on the design of the antenna 303. In embodiments, the patterned bottom conductive layer 101 with such local features can be formed by suitable printing technologies, such as continuous gravure or rolled based printing, roll-to-roll printing, stamp printing or inkjet printing. Various microprinting and/or etching technologies can also be used if desired. The patterned bottom conductive layer can be formed of a metal that is suitable for an electrode for the galvanic cell. The conductive metal can also support the galvanic displacement reaction of the transformative material of the multilayer structure. In non-limiting examples, the metal of the bottom conductive layer can include one or more metals such as zinc, nickel, tin or copper.

Figure 7B:
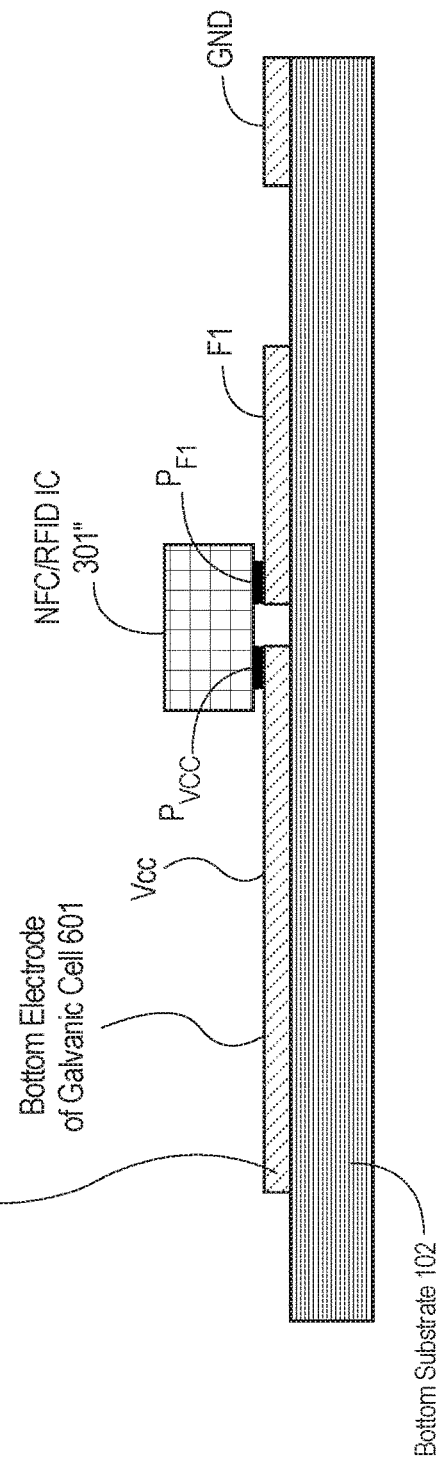

As shown in FIG. 7B, the NFC/RFID integrated circuit 301" can then mounted or interconnected to the patterned conductive layer 101 using suitable interconnect structures (such as ball-type interconnects). In this configuration, the input contact $P_{F1}$, $P_{F2}$, the two antenna contacts $P_{ANT+}$, $P_{ANT-}$, the $V_{cc}$ contact, and the ground or common body $P_{GND}$ are configured to interconnect to corresponding terminals of the NFC/RFID integrated circuit 301".

Figure 7C:
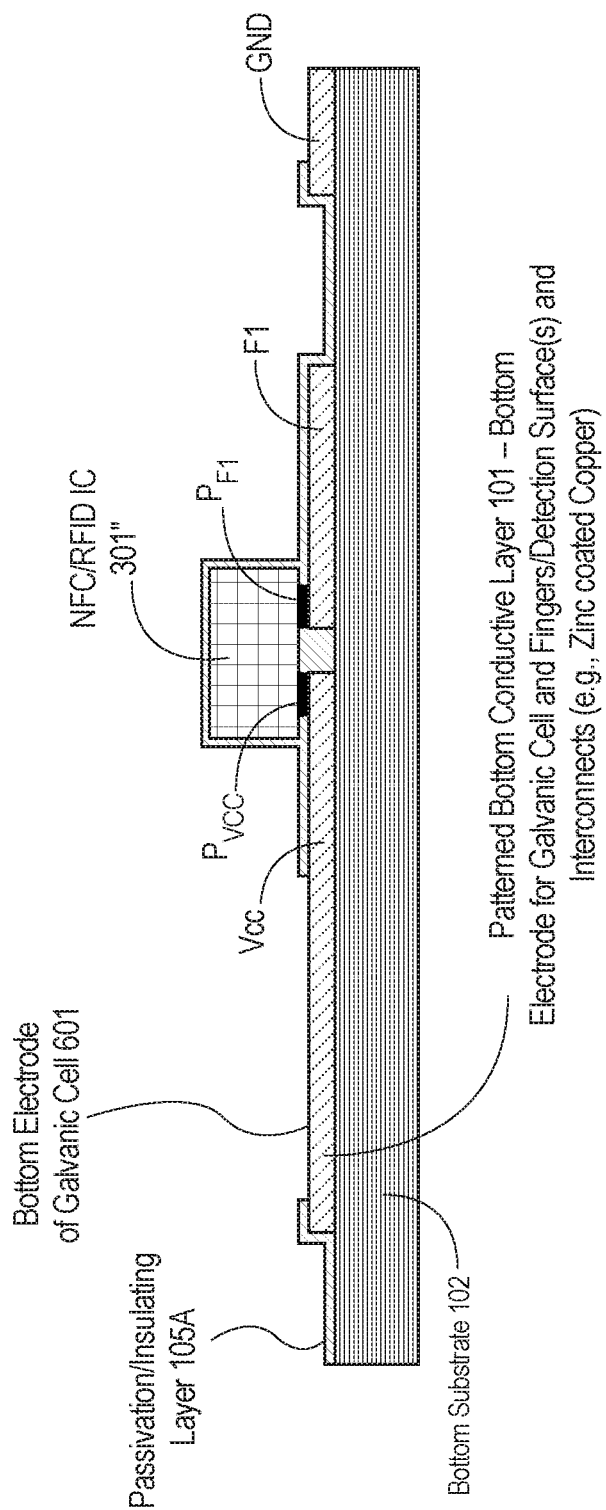

As shown in FIG. 7C, the patterned bottom conductive layer 101 with the NFC/RFID integrated circuit 301" mounted and interconnected thereon is then covered by the electrically-insulating passivation layer 105A. The passivation layer 105A can be patterned (for example, by printing or etching to form an opening in the passivation/insulating layer 105A that exposes a part of the bottom conductive layer 101 that forms the bottom electrode of the galvanic cell 601. In embodiments, the insulating passivation layer 105A can be formed from a thin film of electrically-insulating material such as polyethylene terephthalate (PET), Polyethylene (PE), Polyimide (Kapton), photo-resist polymer, Mylar, a spun polymer, or other suitable encapsulating or insulating material deposited on the conductive layer.

Figure 7D:
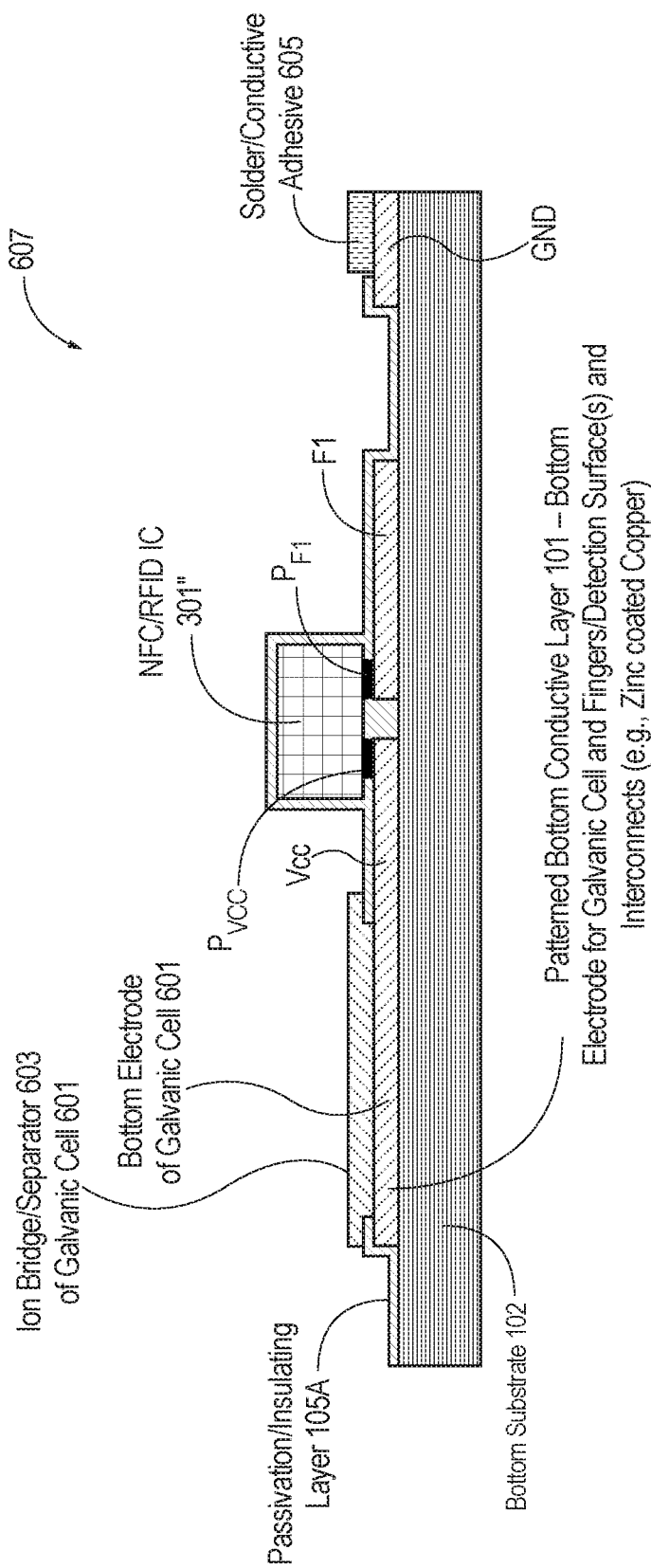

As shown in FIG. 7D, an ion bridge (or separator) 603 of the galvanic cell 601 can be printed or otherwise formed or placed to occupy and fill the opening in the passivation/insulating layer 105A. The ion bridge/separator 603 permits the flow of positive-charged and negative-charged ions therethrough in order maintain charge neutrality in the galvanic cell 601 as the galvanic cell 601 produces electricity by current flow between the bottom electrode and the opposed top electrode of the galvanic cell 601. The ion bridge/separator 603 also functions to prevent the flow of silver ions in the transformative layer across to the bottom electrode (anode) of the galvanic cell 601. In non-limiting examples, the ion bridge 603 can be formed by a thin film of aqueous paste of a soluble electrolyte like a mixture of nitrates, namely, zinc nitrate, lithium nitrate, sodium nitrate which excludes the silver ions of the cathode electrolyte (which can also function as the transformative material). The paste can be made from a gel like silica or preferably a zeolite with can also act as a silver ion blocker. A layer of solder or conductive adhesive 605 can also be formed on the GND electrode and used later to form the final laminate structure. The resultant structure is labeled 607.

Figure 7E:
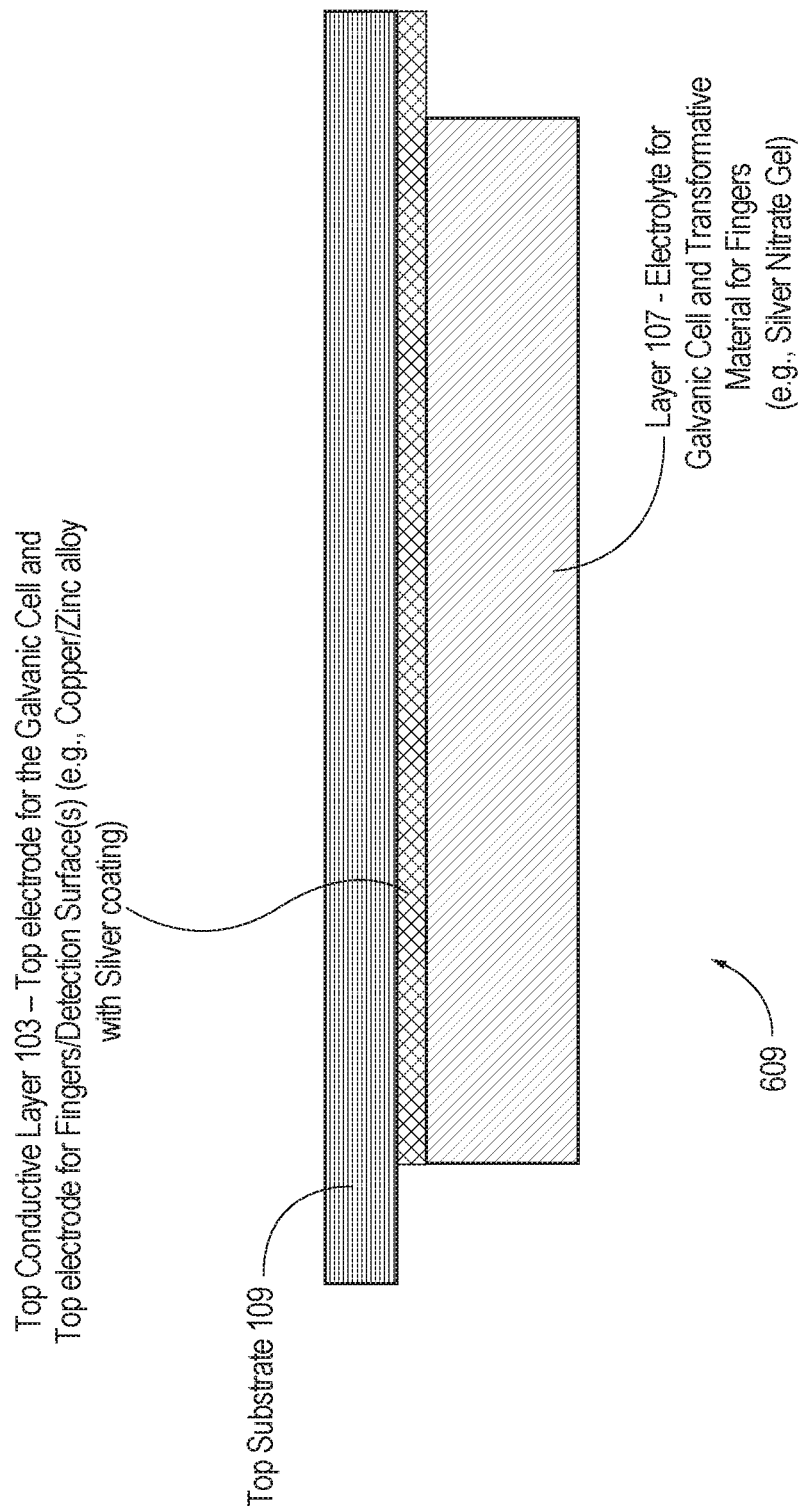

Separately, a multilayer structure 609 is made that includes layer 107 and top conductive layer 103 formed on a flexible electrically-insulating substrate 109 as shown in FIG. 7E. Layer 107 functions as the electrolyte of the galvanic cell 601 and the transformative material for the fingers F1, F2 (or one or more detection surfaces). The top conductive layer 103 forms the top electrode (the cathode) for the galvanic cell 601 and the top electrode for the fingers (F1 and F2) if the multilayer structure. The multilayer structure 533 is similar to the multilayer laminate structure of FIGS. 1A-1C. In embodiments, the multilayer structure 609 can be formed by suitable printing technologies, such as continuous gravure or rolled based printing, roll-to-roll printing, stamp printing or inkjet printing. Various micro-printing technologies can also be used if desired. The top conductive layer 103 can be formed of a metal that is suitable as a cathode electrode for the galvanic cell, preferably silver. The conductive metal can also support the galvanic displacement reaction of the transformative material of the multilayer structure. In non-limiting examples, the metal of the top conductive layer can include one or more noble metals, such as silver or a copper-zinc alloy coated with silver.

Figure 7F:
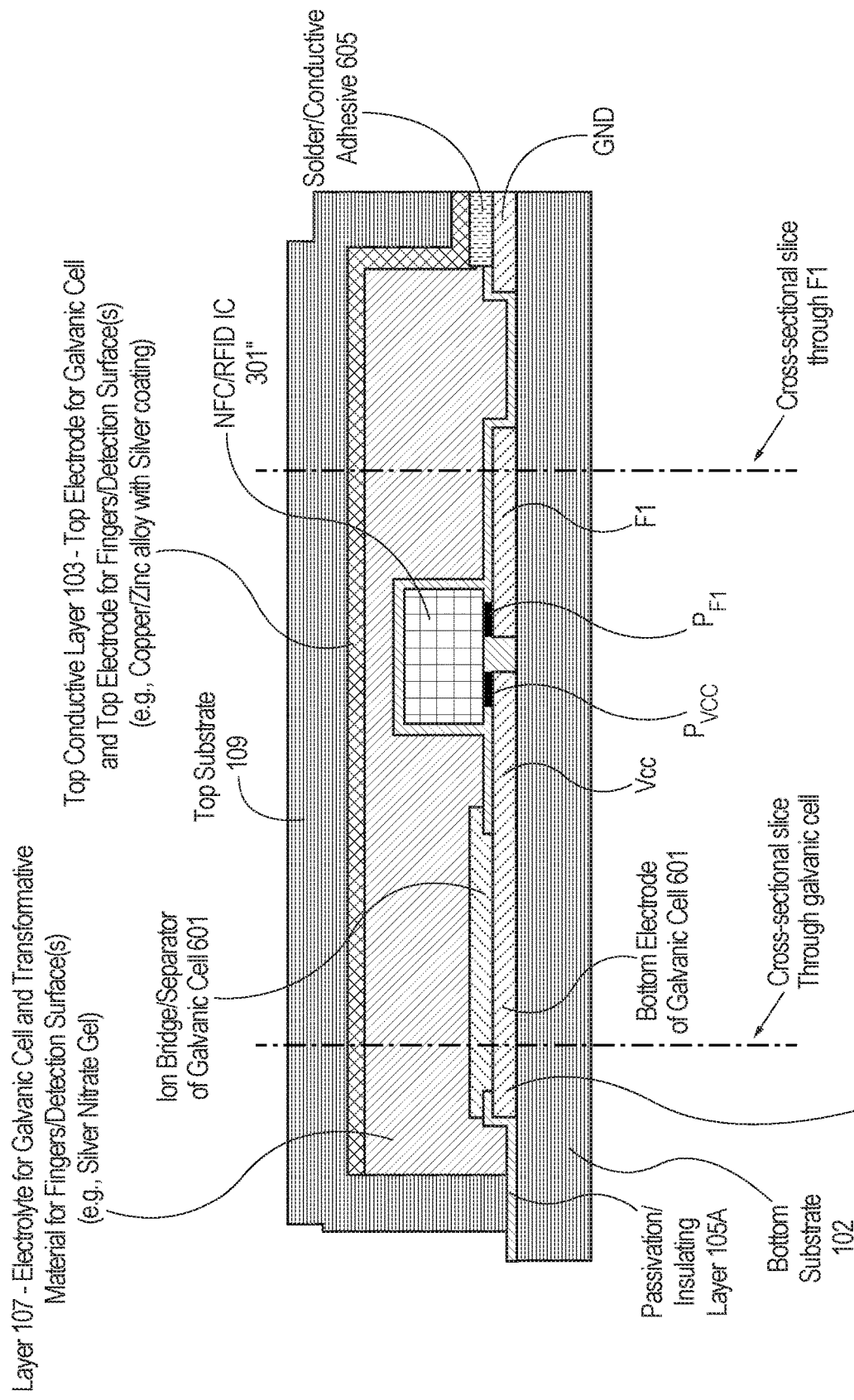

As shown in FIG. 7F, the multilayer structure 609 can then bonded (for example, with the layer of solder or conductive adhesive 605) or otherwise joined to the structure 607 such that the layer 107 is encapsulated as a continuous layer in the space/area that underlies the galvanic cell 601 and the set of fingers (e.g., F1 and F2). In this configuration, the layer 107 can function as the electrolyte of the galvanic cell 601 and the transformative material that changes impedance between the particular finger of the set and the top conductive layer 103 in response to a perforation in the particular finger. The layers of the bonded laminate structure may be thin flexible sheets such that the bonded laminate structure is flexible in nature and thus is able to bend or fold. In this configuration, the layer of solder or conductive adhesive 605 electrically couples the GND electrode and the top conductive layer 103, thus providing an electrical path between the top conductive layer 605 and the common body or ground terminal 413 of the NFC/RFID integrated circuit 301'. Note that the layers of the multilayer structure 609 are configured to cover only a part of the structure 607 such that the antenna 303 (and possibly the passivation layer thereon) is not covered by the layers of the multilayer structure 609 in order to facilitate communication of RF signals with an external reader.

Note that the NFC/RFID integrated circuit 301" and its Vcc terminal and interconnects are disposed inside the multilayer structure and inaccessible or hidden from the external environment. This feature is useful for detecting tamper or other unwanted intrusion events where the NFC/RFID integrated circuit 301' is configured to operate as an active tag (or other tag type) and detect that the electrical power supply signal provided by the galvanic cell 601 is not present and to record information of the event. For example, the NFC/RFID integrated circuit 301" can configure itself to a reset state or record information of the event, such as the time and date, in the non-volatile memory of the NFC/RFID integrated circuit 301'. The event can result from intrusion into the multilayer structure as part of unauthorized removal and replacement of the NFC/RFID integrated circuit 301" or possibly other scenarios (such as the galvanic cell 601 being drained of electrical power). Such reset state or event information can be read from the non-volatile memory of the NFC/RFID integrated circuit 301" in order to detect unauthorized reuse of the NFC/RFID integrated circuit 301" in the same or similar packaging system or tag.

In embodiments, a network of resistors $R_{pu1}$, $R_{p1}$ and $R_{g1}$ can be electrically coupled between adjacent finger pairs and the corresponding input terminals of the NFC/RFID integrated circuit 301" within the confines of the integrated circuit similar to that shown in FIG. 5. In embodiments, the values for the resistors $R_{pu1}$, $R_{p1}$ and $R_{g1}$ of the resistor networks can be selected such that the parallel resistance of $R_{pu1}$ and $R_{p1}$ ($R_{pu1}//R_{p1}$) is less than $R_{g1}$, and $R_{g1}$ is less than $R_{pu1}$. These conditions can provide voltage signals at the input terminals of the NFC/RFID integrated circuit 301" for the corresponding pairs of fingers that allows for discrimination and registration of the interconnection state (or disconnection state) of the corresponding finger pair.

In the embodiment of FIG. 7F, the material of layer 107 can be a silver nitrate gel (or aqueous solution of silver nitrate and soluble nitrates like zinc nitrate, lithium nitrate, sodium nitrate) which is encapsulated as a continuous layer in the multilayer laminate structure.

Figure 7G:
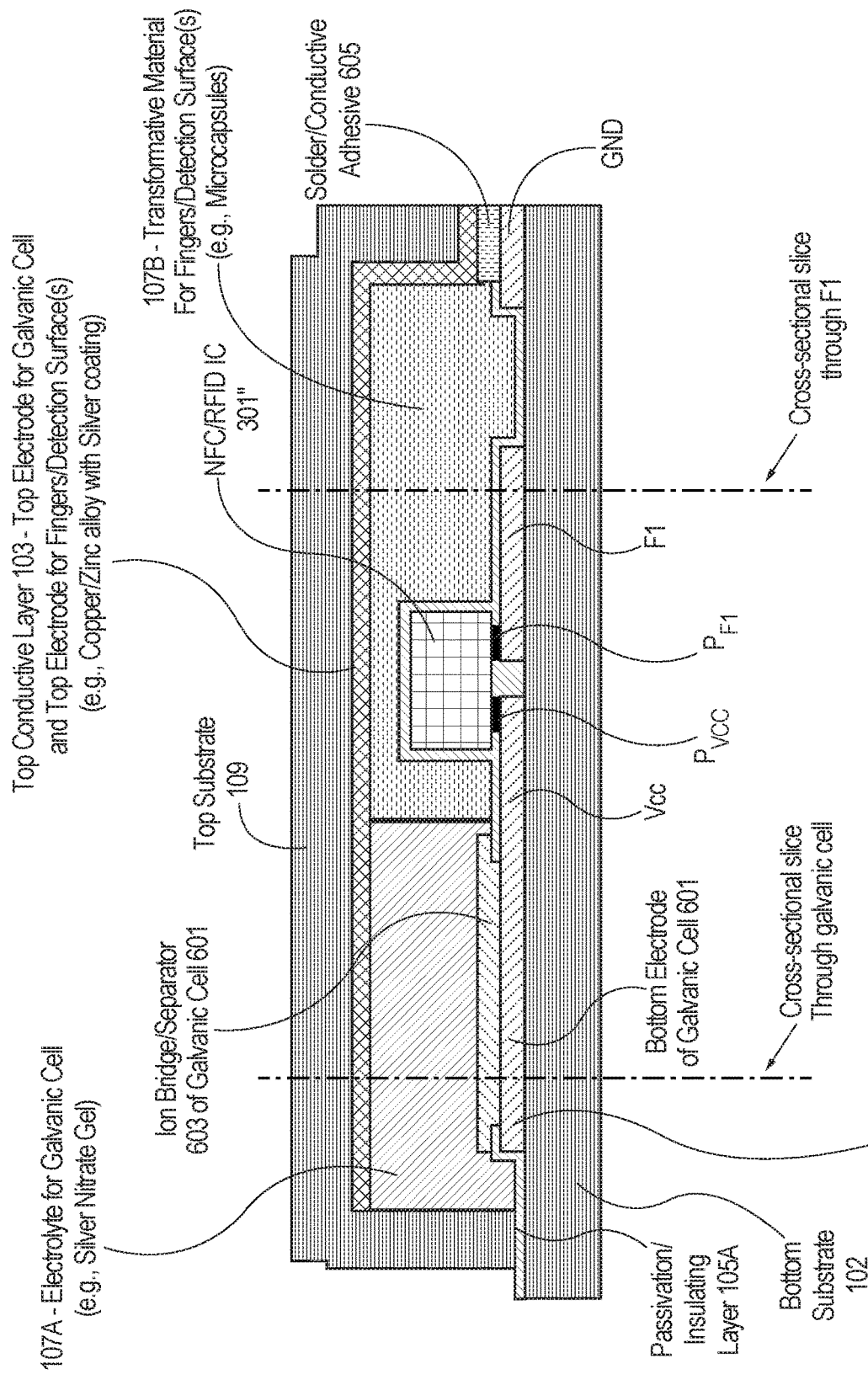

In another embodiment shown in FIG. 7G, the transformative material of the fingers and the electrolyte material of the galvanic cell 601 can be different materials, such as microcapsules of transformative material (labeled 107B) and the electrolyte layer (silver nitrate gel) (labelled 107A). These different materials can be formed as part of the multilayer structure 609 such that the different materials can be disposed (and possibly isolated from one another) in different areas of the multilayer laminate structure as shown.

In embodiments, the at least one integrated galvanic cell 601 can be an electrochemical cell that derives electrical energy from oxidation-reduction (redox) reactions taking place in the cell. It can include two different metals that form opposed parts of the bottom conductive layer 101 and top conductive layer 103. The top electrode formed from the top conductive layer 103 can be in direct contact with the electrolyte material of the cell. In one embodiment, the top conductive layer 103 (top electrode of the cell) is formed from silver metal, or an alloy of copper and zinc that is coated with silver, the bottom conductive layer 101 (bottom electrode) of the cell is formed from metal such as zinc or zinc coated with copper, and the electrolyte material of the cell is a metal ion solution, such as an aqueous solution of silver nitrate and other soluble nitrates like zinc nitrate, lithium nitrate, or sodium nitrate. The ion bridge/separator 603 separates the bottom conductive layer 101 (bottom electrode) of the cell from the electrolyte material of the cell while permitting the flow of positive-charged (except for silver ions) and negative-charged ions therethrough in order maintain charge neutrality in the cell as the cell produces electricity by external current flow between the bottom electrode (bottom conductive layer 101) and the opposed top electrode (top conductive layer 103) of the cell. The ion bridge/separator 603 can include an inert material, such as silica gel, cellulose or zeolites which for example can be applied as a screen printed paste or printed as an ink. The inert material can immobilize an aqueous solution of zinc nitrate and other soluble nitrates like lithium nitrate and sodium nitrate. In this configuration, the connection of the electrical circuitry of the NFC/RFID circuit 301" between the bottom electrode (bottom conductive layer 101) and the opposed top electrode (top conductive layer 103) of the cell causes silver ions of the electrolyte silver nitrate to deposit as solid silver on the top electrode in a reduction reaction, accepting electrons that enter the top electrode from the external circuit. In order to compensate for the reduced positive silver ion concentration in the electrolyte solution, cations (zinc, lithium or sodium ions) enter the electrolyte solution via the ion bridge 603. Furthermore, on the bottom conductor 101, zinc metal loses two electrons (oxidation reaction) and goes into solution as zinc ions into the ion bridge 603. In this manner, during discharge operation of the cell the bottom electrode of the cell is the anode of the cell, and the top electrode of the cell is the cathode of the cell. Electrons flow from the anode (bottom electrode) of the cell and into the cathode (top electrode) of the cell through the external circuit. Conventional current flow in the external circuit is opposite the electron flow and occurs from the cathode (top electrode 101) of the cell and into the anode (bottom electrode 103) of the cell. It is expected that the voltage provided by the zinc-silver cell to be 1.56 Volts. The acceptable current capacity of the cell can vary and can be configured by the thickness of the anode conductive layer, the electrolyte concentration of silver nitrate and the size (area) of the cell.

In other embodiments, the packaging system or tag can include single laminate structure or a stacked configuration of multiple laminate structures that employ multiple NFC/RFID integrated circuits. In these systems, one or more of the NFC/RFID integrated circuits can be powered by an integrated galvanic cell. Non-limiting examples of system architectures that employ multiple NFC/RFID integrated circuits is described in U.S. patent application Ser. No. 16/449,242, herein incorporated by reference in its entirety.

In other embodiments, the packaging system or tag can include multiple integrated galvanic cells to provide electrical power to one or more NFC/RFID integrated circuits. The multiple integrated galvanic cells can be electrically coupled to one or more NFC/RFID integrated circuits in a series arrangement (in order to boost the supply voltage signal), in a parallel arrangement (in order to boost the acceptable current load of the supply voltage signal), or a combination of series and parallel arrangements as desired.

In embodiments, the packaging system or tag as described herein (the multilayer laminate structure with detection surfaces or fingers and NFC/RFID integrated circuit(s) and coil antenna(e) and integrated galvanic cell(s)) can be used as a sensing barrier or surface that protects the opening into a rigid closed-wall container (such as glass bottle) that houses at least one article.

In other embodiments, the packaging system or tag as described herein (the multilayer laminate structure with detection surfaces or fingers and NFC/RFID integrated circuit(s) and coil antenna(e) and integrated galvanic cell(s)) can be used as a sensing barrier that defines and protects a sealed envelope or pouch or box or other container.

In embodiments, the packaging system or tag as described herein can be fabricated in a flexible rolls or sheets. Non-limiting examples of such flexible rolls or sheets is described in U.S. patent application Ser. No. 16/449,242, herein incorporated by reference in its entirety.

In embodiments, the transformative material of the packaging system or tag as described herein can include a metal ion solution (e.g., silver nitrate gel solution or aqueous solution of silver nitrate and zinc nitrate and other soluble nitrates like sodium and lithium nitrates) that is displaced (or flows) or undergoes a galvanic displacement reaction that precipitates solid-phase metal (e.g., silver) in response to the intrusion or perforation through the multilayer laminate structure, where the displacement or the precipitation of the solid-phase metal or both changes the impedance between the first and second conductive layers.

In other embodiments, the transformative material of the packaging system or tag can be an electrolyte of other metals or alloys that undergo a galvanic displacement reaction to form a solid-phase precipitate that changes the impedance between the opposed conductive layers of the laminate structure. For example, the electrolyte can include copper, tin, nickel or other metals. In this case, the outer conductive layer of the multilayer laminate structure that contributes to the galvanic displacement reaction can be formed from a less noble metal (which has a lower galvanic potential) and which may result in a lower cell potential but will cost less than silver.

In other embodiments, the ion bridge/separator layer can be made of microcapsules of solutions of zinc nitrate and other soluble nitrates mixed with powdered silica gel or zeolites and applied as a quick drying paste using a non-aqueous solvent. When the tag needs to be deployed, this separator layer can be activated into an ion bridge by breaking the capsule by either pressure or raising the temperature above the melting point of the shell of the microcapsule to release the aqueous solution of zinc nitrate and the other soluble nitrates. This results in minimization of self-discharge and an increase in the shelf-life of the galvanic cell.

In other embodiments, the multilayer laminate structure can include a chemical reagent that assists or enhances the galvanic displacement reaction or physical change of the transformative material (such as a silver nitrate gel solution or aqueous solution of silver nitrate and zinc nitrate). For example, the chemical reagent can be encapsulated by the intermediate layer 105A between the between the first conductive layer 101 and the transformative material 107 (or aqueous solution of silver nitrate and soluble nitrates like zinc nitrate, lithium nitrate, sodium nitrate). Other configurations can be used to encapsulate the chemical reagent within the multilayer laminate structure in close proximity to the transformative material.

In embodiments, the chemical reagent can include a reducing agent (e.g., sodium borohydride) that can be released by the intrusion event and mix with the transformative material to assist in the chemical reaction or physical change of the transformative material that results in the formation of the low impedance current path between the opposed conductive layers 101 and 103. The reducing reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof.

In other embodiments, the multilayer laminate structure can include microcapsules of a chemical reagent that are dispersed in a matrix of the transformative material. The chemical reagent microcapsules can be formed by a thin film insulator encapsulant that surrounds a small volume of the chemical reagent. The chemical reagent that fills the microcapsules can include a reducing agent (e.g., sodium borohydride) that can be released by the intrusion event and mix with the transformative material 107 to assist in the chemical reaction or physical change of the transformative material that results in the formation of the low impedance current path between the opposed conductive layers 101 and 103. The reducing reagent can be configured to react with the transformative material in response to an intrusion event and aids in the transformation of the transformative material. For illustrative purposes, the reducing agent can be a solution of sodium borohydride and/or glucose that assists or enhances the galvanic displacement reaction of the silver nitrate solution (silver nitrate gel or aqueous solution of silver nitrate and zinc nitrate) that precipitates solid-phase silver. The reducing agent can also possibly include other components such as catalysts, stabilizers, surfactants or initiators, in any combination thereof.

In other embodiments, the multilayer laminate structure can include microcapsules of the transformative material that are dispersed in a matrix of chemical reagent. The transformative material microcapsules can be formed by a thin film insulator encapsulant that surrounds a small volume of the transformative material (e.g., silver nitrate gel solution). The matrix of chemical reagent includes a reducing agent (e.g., sodium borohydride). The transformative material of the microcapsules can be released by the intrusion event and mix with the chemical reagent matrix to assist in the chemical reaction or physical change of the transformative material that results in the formation of the low impedance current path between the opposed conductive layers 101 and 103. The reagent can be configured to react with the transformative material in response to an intrusion event and aids in the transformation of the transformative material. For illustrative purposes, the chemical reagent matrix can be a solution of sodium borohydride and/or glucose that assists or enhances the galvanic displacement reaction of the silver nitrate solution (silver nitrate gel or aqueous solution of silver nitrate and zinc nitrate) that precipitates solid-phase silver. The chemical reagent matrix can possibly include other components such as catalysts, stabilizers, surfactants or initiators, in any combination thereof. In this embodiment, the intermediate layers of the laminate structure can be omitted.

In other embodiments, the multilayer laminate structure can include microcapsules of chemical reagent and microcapsules of transformative material that are both dispersed in an inert matrix. The chemical reagent microcapsules can be formed by a thin film insulator encapsulant that surrounds a small volume of the chemical reagent. The transformative material microcapsules can be formed by a thin film insulator encapsulant that surrounds a small volume of the transformative material (e.g., silver nitrate gel solution). The chemical reagent microcapsules include a chemical reagent (such as a reducing agent of sodium borohydride). The chemical reagent and the transformative material of the microcapsules can be released by the intrusion event and mix with one another in the inert matrix to assist in the chemical reaction or physical change of the transformative material that results in the formation of the low impedance current path between the opposed conductive layers 101 and 103. The chemical reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof. Note that in this embodiment, the intermediate layers 105A and 105B of the laminate structure can be omitted.

Details of embodiments that employ chemical reagents and microcapsule forms of the chemical reagents and/or transformative material are set forth in U.S. Pat. No. 10,332,272, commonly assigned to assignee of the present application and herein incorporated by reference in its entirety.

In embodiments, the NFC/RFID integrated circuit of the tag can be configured such that upon loss of electrical power at its Vcc terminal (or such electrical power falling below a threshold low level), the NFC/RFID integrated circuit defaults to a reset state or registers the loss of Vcc. This state or event can be detected by reading the NFC/RFID integrated circuit (possibly using harvested electrical power) and interpreted as a potential tamper event or end of life alert. This functionality can make the tag tamper resistant and prevent the lifting and/or reuse of an NFC/RFID integrated circuit on a tampered system or tag. Note that when an NFC/RFID integrated circuit is lifted or separated from its tag, the NFC/RFID integrated circuit will loss electrical power at its Vcc terminal (or such electrical power will fall below a threshold low level) and the NFC/RFID integrated circuit will default to a reset state or registers the loss of power. This state or event can be detected by reading the NFC/RFID integrated circuit (possibly using harvested electrical power) and interpreted as a potential tamper event.

In other embodiments, an intrusion into the multi-layer laminate structure in the vicinity of the galvanic cell can result in an electrical short across the opposed terminals (cathode and anode) of the galvanic cell, which will lead to loss of electrical power at the Vcc terminal of the NFC/RFID integrated circuitry, and the NFC/RFID integrated circuit will default to a reset state or register the loss of power. This state or event can be detected by reading the NFC/RFID integrated circuit (possibly using harvested electrical power) and interpreted as a potential tamper event.

In other embodiments, the NFC/RFID integrated circuit can be configured to register an event when the voltage of galvanic cell drops to less than a critical value due to expired shelf life or excessive heat.

In other embodiments, the NFC/RFID integrated circuit of the tag can include electronic circuitry that harvests electrical power from an RF signal (such as the RF signal transmitted by an interrogator or other suitable RF signal) and supplies the harvested electrical power to the integrated galvanic cell(s) of the tag via the Vcc terminal in order to recharge the integrated galvanic cell(s) of the tag.

In other embodiments, the ion bridge/separator layer of the integrated galvanic cell(s) can be formed from microcapsules of an ionic species of soluble nitrates (such as zinc nitrate, sodium nitrate, lithium nitrate). The at least one galvanic cell can be activated by applying pressure so as to break the microcapsules and release the ionic species in the ion bridge layer and activate ionic conduction, or by applying heat so as to melt the microcapsules and release the ionic species in the ion bridge layer and activate ionic conduction.

In still other embodiments, the top conductive layer 103 can be positioned facing the package product and closest to the packaged product, while the bottom conductive layer/detection surface 101 can be positioned facing away from the package product and furthest from the packaged product. This embodiment is similar to the embodiments as described above; however, the ordering of the layers of the multilayer laminate structure from the inside to outside is inverted with respect the layer ordering of the embodiments described herein.

In another aspect, a method is provided to detect, register, verify and validate that at least one packaged article has or has not experienced intrusion or product falsification or counterfeiting. The method employs a packaging system or tag as described herein where at least one operational characteristic of the NFC/RFID integrated circuit is dependent on change in impedance of distinct fingers (or a single detection surface) of a multilayer laminate structure in response to an intrusion or perforation. The method can include employing an NFC/RFID interrogator to ascertain the operational characteristic of the NFC/RFID integrated circuit(s) to detect that the at least one packaged article has or has not experienced intrusion and output an indication (e.g., visual or audible notification) of such intrusion conditions if and when detected. Alternatively or additionally, the at least one operational characteristic of the same NFC/RFID integrated circuit (or additional NFC/RFID integrated circuit) can be dependent on a predefined codeword represented by the physical layout of distinct fingers of the same or different multilayer laminate structure. The method can further include employing an NFC/RFID interrogator to ascertain the operational characteristic of the same or additional NFC/RFID integrated circuit to detect that the at least one packaged article is suspected counterfeit or falsified goods and output an indication (e.g., visual or audible notification) of such conditions if and when detected. The NFC/RFID integrated circuit(s) and NFC/RFID interrogator can cooperate to read other information that is related to the packaged article(s) and stored by the NFC/RFID integrated circuit, such as a product identifier, manufacturing information (such as Plant Number and Lot number), quality control information, shipping information, consumer information (e.g., patient compliance to a course of treatment) and other arbitrary information.

The packaging system or tag and associated method can be used for a wide range of articles, including those under inventory control, but not limited to the following:
  medicine (e.g., insulin, vaccines, delicate medicines)
  foods or beverages (e.g., dry foods, meats, fruits, vegetables, wines)
  chemicals (process integrity)
  forensics samples (e.g., collected from the scene of a crime)
  electronics (e.g., specialized microchips)
  electro-mechanical products (e.g., airplane parts)
  branded products (e.g., Gucci, Chanel, Wine, Spirits)
  lifestyle personal products (e.g., condoms, sex toys)
  documents or works of art (e.g., confidential and private documents, paper, books, paintings)
  plastics or rubbers (e.g., beads, buttons, utensils and decorations)
  fabrics or leather goods (e.g., clothing, handbags)
  wood (e.g., as used in light construction)
  combinations of these products or other products thereof Furthermore, the packaging system or tag and method can be used to detect, register, verify and validate that at least one packaged article has or has not experienced intrusion or product falsification or counterfeiting and read other information that is related to the packaged article(s) and stored by the NFC/RFID integrated circuit over time (e.g., polled by one or more external NFC/RFID interrogators over time). Such operations can be useful as the article is exchanged along a supply chain. The supply chain can include manufacturing, shipping (for an origin to destination with intermediate locations therebetween), warehousing and distribution, retail stores or shops, point of sale terminals, and other arbitrary points along the supply chain.

The packaging systems or tags as described herein provide a number of advantages over current passive and active tag designs, including:

i) the multilayer laminate structure can support the integration of one or more galvanic cells in the same process flow.

ii) the NFC/RFID circuit and other components of the packaging system or tag can perform the function of an active tag or a battery-assisted passive tag.

iii) the galvanic cell can be a simple cell comprising of electrodes made of two disparate metals (such as Zinc and Silver).

iv) the expected voltage of the galvanic cell is 1.56 Volts.

v) the electrolyte of the galvanic cell can be an aqueous mixture of silver nitrate and zinc nitrate.

vi) the galvanic cell employs an ion bridge or separator; in one embodiment, it includes zinc nitrate and other soluble nitrates like lithium nitrate and sodium nitrate; the ion bridge/separator can be a thin film structure made out of microencapsulated materials which can be activated by pressure and/or temperature to increase shelf life; the ion bridge/separator can include gels or liquids immobilized using an inert material like silica gel or cellulose; the ion bridge separator can be applied as a screen printed paste or printed as an ink or spray coated.

vii) the galvanic cell uses a finger/conducting plane with input to the Vcc terminal of the NFC/RFID IC, such that Vcc is provided to the NFC/RFID IC by another finger.

viii) the multilayer laminate structure also supports detection of intrusion and/or incursion; in this caser, an intrusion through the battery can also result in a short circuit for intrusion detection.

ix) the galvanic cell can be made from insulating transformative material using microcapsules.

x) the Vcc lead of the integrated galvanic cell is not exposed to the outside environment. This improves tamper resistance.

xi) the integrated galvanic cell can be used to make the tag tamper resistant, since the NFC/RFID IC can be designed such that upon loss of power at the Vcc terminal, it defaults to a reset state or registers the loss of Vcc. This is to prevent the reuse of a tag chip on a tampered system or tag.

xii) the galvanic cell is defined by the electrode surface in the laminate structure and can be distributed in any form on the surface to make it more difficult to counterfeit the system or tag.

xiii) the material of the transformative layer (e.g., silver nitrate) and the material of the ion bridge (e.g., zinc nitrate and other soluble nitrates like lithium nitrate and sodium nitrate gel) can retain moisture more effectively with the top ground plane metal cover and the metal fingers covering majority of the surface which increases the shelf life of the system or tag by not drying out.

xiv) the NFC/RFID IC can be configured to register evidence of tampering when an attempt has been made to lift the chip for reuse with a new laminate. The moment the chip loses the Vcc connection with the integrated circuit, the integrated circuitry can register this event.

xv) the NFC/RFID IC can be configured to register an event when the voltage of galvanic cell drops to less than a critical value due to expired shelf life or excessive heat.

There have been described and illustrated herein several embodiments of a packaging system or tag that can be used to verify and validate package integrity and related conditions. While particular embodiments of the invention have been described, it is not intended that the invention be limited thereto, as it is intended that the invention be as broad in scope as the art will allow and that the specification be read likewise. Thus, while particular combinations of materials have been disclosed, it will be appreciated that other suitable materials can be used as well. Moreover, while particular configurations have been disclosed in reference to the containers and forms of the packaging, it will be appreciated that other configurations could be used as well. It will therefore be appreciated by those skilled in the art that other modifications could be made to the provided invention without deviating from its spirit and scope as claimed.

What is claimed is:

1. A packaging system for at least one article or item, comprising:
    a multilayer laminate structure that includes at least one integrated galvanic cell and an RF antenna, wherein the multilayer laminate structure further includes an encapsulated transformative material that is disposed between first and second conductive layers, wherein the transformative material is configured to undergo a state change that changes impedance between the first and second conductive layers in response to an intrusion or perforation through at least part of the multilayer laminate structure, and wherein the first and second conductive layers are further configured to provide the RF antenna and opposed electrodes of the at least one integrated galvanic cell; and
    at least one NFC/RFID integrated circuit that is mechanically secured to the multilayer laminate structure and electrically coupled to the RF antenna, the at least one galvanic cell, and other parts of the first and second conductive layers of the multilayer laminate structure;
    wherein the at least one galvanic cell is configured to supply electrical power to the at least one NFC/RFID integrated circuit;
    wherein one of the first and second conductive layers of the multilayer laminate structure is configured to provide i) at least one detection surface that encapsulates the transformative material, ii) the RF antenna and iii) a first electrode of the at least one integrated galvanic cell;
    wherein the other of the first and second conductive layers of the multilayer laminate structure is configured to provide a second electrode of the at least one integrated galvanic cell; and
    wherein the at least one integrated galvanic cell is provided by an encapsulated electrolyte material and ion bridge disposed between the first and second conductive layers.

2. A packaging system according to claim 1, wherein:
    the one of the first and second conductive layers of the multilayer laminate structure is patterned by printing or etching to define the at least one detection surface, the RF antenna and the first electrode of the at least one integrated galvanic cell.

3. A packaging system according to claim 1, wherein:
    the multilayer laminate structure further includes a passivation or insulating layer that covers portions of the one of the first and second conductive layers that is configured to provide the first electrode of the at least one integrated galvanic cell, wherein the passivation or insulating layer includes an opening that is occupied by the ion bridge such that the ion bridge interfaces to the first electrode.

4. A packaging system according to claim 1, wherein:
    the at least one NFC/RFID integrated circuit comprises a power supply terminal that is electrically coupled to the at least one integrated galvanic cell, wherein the at least one NFC/RFID integrated circuit and its power supply terminal are disposed inside the multilayer laminate structure and inaccessible or hidden from an external environment.

5. A packaging system according to claim 4, wherein:
    one of the first and second conductive layers is configured to provide the RF antenna and the first electrode of the at least one integrated galvanic cell and is further configured to provide electrical coupling between the first electrode of the at least one integrated galvanic cell and the power supply terminal of the at least one NFC/RFID integrated circuit.

6. A packaging system according to claim 1, wherein the transformative material is configured to undergo a state change that changes impedance between the detection surface and the other conductive layer in response to an intrusion involving the detection surface.

7. A packaging system according to claim 6, wherein the detection surface can be electrically coupled to a corresponding input terminal of the at least one NFC/RFID integrated circuit, wherein the at least one NFC/RFID integrated circuit is configured to detect a signal at the input terminal that results from the impedance change between the detection surface and the other conductive layer due to the intrusion involving the detection surface.

8. A packaging system according to claim 7, wherein:
    the at least one NFC/RFID integrated circuit is further configured to derive data from such signal and communicate the data to an external reader.

9. A packaging system according to claim 1, wherein:
    one of the first and second conductive layers of the multilayer laminate structure is configured to provide i) a set of distinct sections or fingers, ii) the RF antenna, and iii) a first electrode of the at least one integrated galvanic cell, wherein one or more pairs of fingers in the set are electrically connected to one another by metal traces or wires or other suitable conductive material, while the other pairs of fingers in the set are electrically-disconnected from one another by insulating material or insulating void space.

10. A packaging system according to claim 9, wherein:
    the set of fingers are electrically coupled to corresponding input terminals of the least one NFC/RFID integrated circuit, and the at least one NFC/RFID integrated circuit is configured to sense and decode voltage signals received at its input terminals.

11. A packaging system according to claim 10, wherein:
    electrical connection and disconnection of the fingers and the interconnection of the fingers to the input terminals are dictated by a particular design of the packaging system such that the particular design will produce voltage signals at the input terminals of the at least one NFC/RFID integrated circuit that decode to a predefined codeword, wherein the predefined codeword is associated with genuine packaged goods and is used to distinguish the genuine packaged goods from counterfeit or falsified goods.

12. A packaging system according to claim 1, wherein: the transformative material and the electrolyte material are the same material.

13. A packaging system according to claim 12, wherein: the same material is encapsulated as a continuous layer in the multilayer laminate structure.

14. A packaging system according to claim 1, wherein: the transformative material and the electrolyte material are different materials.

15. A packaging system according to claim 1, wherein: the at least one NFC/RFID integrated circuit is configured to operate as an active tag.

16. A packaging system according to claim 1, wherein: the at least one NFC/RFID integrated circuit is configured to update state of the at least one NFC/RFID integrated circuit or register an event when electrical power is lost, or falls below a threshold low level, at a power supply terminal of the at least one NFC/RFID integrated circuit.

17. A packaging system according to claim 16, wherein: the state or event represents evidence of tampering, or end of life event.

18. A packaging system according to claim 1, wherein: the at least one NFC/RFID integrated circuit is configured to update state of the at least one NFC/RFID integrated circuit or register an event when voltage produced by the at least one galvanic cell drops below a critical value.

19. A packaging system according to claim 18, wherein: the state or event represents that the at least one galvanic cell has an expired shelf life or experienced excessive heat.

20. A packaging system according to claim 1, wherein: the ion bridge layer of the at least one galvanic cell is formed from microcapsules of an ionic species of soluble nitrates.

21. A packaging system according to claim 20, wherein: the at least one galvanic cell is activated by applying pressure so as to break the microcapsules and release the ionic species in the ion bridge layer and activate ionic conduction, or by applying heat so as to melt the microcapsules and release the ionic species in the ion bridge layer and activate ionic conduction.

* * * * *